United States Patent
You

(10) Patent No.: US 12,334,593 B2
(45) Date of Patent: Jun. 17, 2025

(54) CONNECTING ASSEMBLY, BATTERY MODULE, APPARATUS, AND METHOD FOR MANUFACTURING CONNECTING ASSEMBLY

(71) Applicant: Jiangsu Contemporary Amperex Technology Limited, Jiangsu (CN)

(72) Inventor: Shubing You, Jiangsu (CN)

(73) Assignee: Jiangsu Contemporary Amperex Technology Limited, Changzhou (CN)

(*) Notice: Subject to any disclaimer, the term of this patent is extended or adjusted under 35 U.S.C. 154(b) by 641 days.

(21) Appl. No.: 17/563,102

(22) Filed: Dec. 28, 2021

(65) Prior Publication Data

US 2022/0123439 A1   Apr. 21, 2022

Related U.S. Application Data

(63) Continuation of application No. PCT/CN2020/130907, filed on Nov. 23, 2020.

(30) Foreign Application Priority Data

Mar. 31, 2020 (CN) .......................... 202010241356.X

(51) Int. Cl.
    *H01M 50/509* (2021.01)
    *H01M 50/593* (2021.01)
(52) U.S. Cl.
    CPC ....... *H01M 50/509* (2021.01); *H01M 50/593* (2021.01)
(58) Field of Classification Search
    CPC ............. H01M 50/509; H01M 50/512; H01M 50/514; H01M 50/51; H01M 50/528;
    (Continued)

(56) References Cited

U.S. PATENT DOCUMENTS

2012/0328908 A1* 12/2012 Han ................... H01M 50/519
                                                      429/7
2015/0072211 A1   3/2015 Nakamura et al.
(Continued)

FOREIGN PATENT DOCUMENTS

CN        102263301 A      11/2011
CN        203839445 U       9/2014
(Continued)

OTHER PUBLICATIONS

The First Office Action for European Application No. 20929038.6, dated Nov. 4, 2022, 3 pages.
(Continued)

*Primary Examiner* — Raymond Alejandro
(74) *Attorney, Agent, or Firm* — East IP P.C

(57) ABSTRACT

A connecting assembly, a battery module, an apparatus, and a method for manufacturing a connecting assembly are provided. The connecting assembly is for a battery module. The battery module includes two or more secondary batteries, and the connecting assembly includes: a connecting piece configured to be electrically connected with the secondary batteries, and the connecting pieces includes a connecting portion; an insulating plate having an integrally modeled structure, the connecting portion and the insulating plate are connected in a non-detachable manner to form an integral structure, and the insulating plate is configured to restrict movement of the connecting piece. The connecting assembly provided in the present application can ensure reliable and stable connection between the connecting piece and the insulating plate, and improve the safety for using the connecting assembly.

12 Claims, 15 Drawing Sheets

(58) Field of Classification Search
CPC ............. H01M 50/529; H01M 50/593; H01M 50/586; H01M 50/588
See application file for complete search history.

(56) References Cited

U.S. PATENT DOCUMENTS

| | | | |
|---|---|---|---|
| 2018/0309281 | A1 | 10/2018 | Ichikawa et al. |
| 2020/0335745 | A1* | 10/2020 | Hou .................. H01M 10/0481 |

FOREIGN PATENT DOCUMENTS

| | | | |
|---|---|---|---|
| CN | 105914319 | A | 8/2016 |
| CN | 205429047 | U | 8/2016 |
| CN | 107403899 | A | 11/2017 |
| CN | 109792026 | A | 5/2019 |
| CN | 209169276 | U | 7/2019 |
| CN | 210272511 | U | 4/2020 |
| CN | 111129412 | A | 5/2020 |
| EP | 1988589 | A1 | 11/2008 |
| JP | 2000149909 | A | 5/2000 |
| JP | 2002164034 | A | 6/2002 |
| JP | 2010097722 | A | 4/2010 |
| JP | 2015115275 | A | 6/2015 |
| JP | 2017069047 | A | 4/2017 |

OTHER PUBLICATIONS

The First Office Action for Japanese Application No. 2022-532694, dated Jul. 3, 2023, 8 pages.
The Search Report by Registered Search Organization for Japanese Application No. 2022-532694, dated May 31, 2023, 16 pages.
The extended European search report for European Application No. 20929038.6, dated Jun. 7, 2022, 7 pages.
The International search report for PCT Application No. PCT/CN2020/130907, dated Feb. 22, 2021, 15 pages.
The First Office Action for China Application No. 202010241356.X, dated May 13, 2020, 12 pages.
The Second Office Action for China Application No. 202010241356.X, dated May 29, 2020, 6 pages.
The Rejection Decision for China Application No. 202010241356.X, dated Jun. 11, 2020, 7 pages.

* cited by examiner

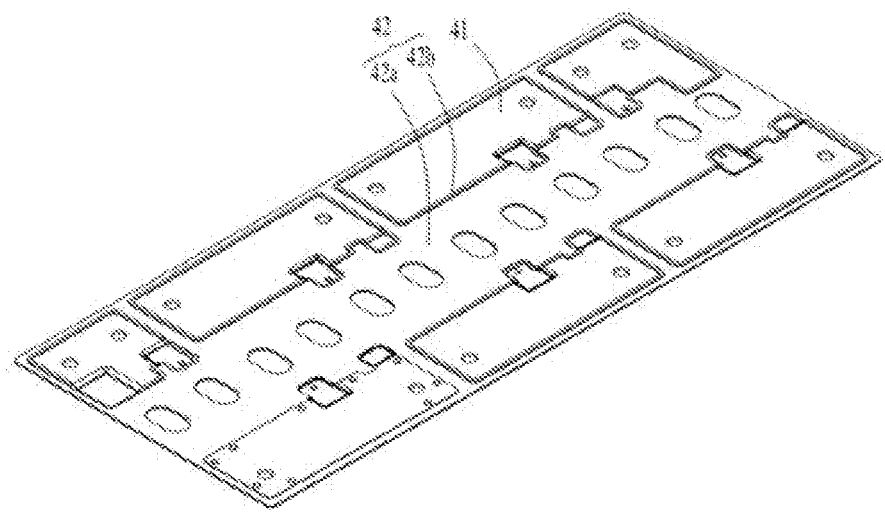

Fig. 18

Placing a connecting piece including a connecting portion in a predetermined mold

↓

Integrally forming an insulating plate around the connecting piece by a high-speed injection molding process, where the connecting portion and the insulating plate are connected to each other in a non-detachable manner to form an integral structure, and the connecting piece and the insulating plate constitute the connecting assembly

Fig. 19

CONNECTING ASSEMBLY, BATTERY MODULE, APPARATUS, AND METHOD FOR MANUFACTURING CONNECTING ASSEMBLY

CROSS-REFERENCE TO RELATED APPLICATIONS

This application is a continuation of International Application No. PCT/CN2020/130907, filed on Nov. 23, 2020, which claims priority to Chinese Patent Application No. 202010241356.X, filed on Mar. 31, 2020, both of which are hereby incorporated by reference in their entireties.

TECHNICAL FIELD

This application relates to the field of battery technology, and in particular to a connecting assembly, a battery module, an apparatus, and a method for manufacturing a connecting assembly.

BACKGROUND

With the development of science and technology and the transformation of the world's energy structure, sustainable energy sources are gradually replacing traditional fossil fuels and becoming mainstream energy sources. For example, electric vehicles are gradually replacing traditional fuel vehicles. One of the core components in electric vehicles are battery modules. The battery modules are used for providing electrical power for electric vehicles. A battery module includes two or more secondary batteries, an insulating plate arranged on one side of the secondary batteries, and a connecting piece configured to electrically connect the secondary batteries. The insulating plate can be used for isolating a wiring harness. The connecting piece can be detachably connected to the insulating plate. However, the connecting piece is liable to be separated from the insulating plate, resulting in that the connecting piece is not insulated by the insulating plate, which poses a safety risk.

SUMMARY

The present application provides a connecting assembly, a battery module, an apparatus, and a method for manufacturing a connecting assembly. The connecting assembly can ensure reliable and stable connection between the connecting piece and the insulating plate, and improve the safety for using the connecting assembly.

In an aspect, the present application provides a connecting assembly for a battery module. The battery module includes two or more secondary batteries, and the connecting assembly includes: a connecting piece configured to be electrically connected with the secondary batteries, the connecting pieces including a connecting portion; an insulating plate having an integrally modeled structure, where the connecting portion and the insulating plate are connected in a non-detachable manner to form an integral structure, and the insulating plate is configured to restrict movement of the connecting piece.

The connecting assembly provided by the present application includes an insulating plate and a connecting piece. The insulating plate itself is an integrally modeled structure. The connecting portion of the connecting piece is embedded in the insulating plate. The connecting piece is connected with the insulating plate in an embedded manner by the connecting portion, so that the connecting piece and the insulating plate form an integral non-detachable structure. The secondary batteries may be electrically connected by the connecting piece. Since the connecting piece and the insulating plate are connected in an embedded manner to form an integral structure, the connection state between the connecting piece and the insulating plate is reliable and stable, and the connection structure is robust. Therefore, when vibration occurs during the use of the battery module, the connecting piece is effectively restricted by the insulating plate. Thus, the possibility of the connecting piece being separated from the insulating plate due to vibration stress can be reduced, and the safety of the battery module during use can be ensured.

According to an embodiment of the present application, one of the connecting portion and the insulating plate includes a protrusion, the other includes a receiving portion, and the protrusion and the receiving portion are connected with each other in an embedded manner.

According to an embodiment of the present application, a shape of the protrusion and a shape of the receiving portion match; or, the connecting portion includes a first connecting section and a second connecting section that are connected, and the first connecting section and the second connecting section are arranged offset to each other.

According to an embodiment of the present application, the receiving portion includes two or more extending sections, the two or more extending sections are arranged along a direction in which the receiving portion is recessed, and an orthographic projection of one of two adjacent extending sections lies within an orthographic projection of the other of the two adjacent extending sections.

According to an embodiment of the present application, the receiving portion is a hole or a groove.

According to an embodiment of the present application, the connecting portion includes the receiving portion, the receiving portion is an embedding through hole extending along a thickness direction of the insulating plate, the insulating plate includes the protrusion penetrating through the receiving portion, and portions of the insulating plate located on upper and lower sides of the connecting portion are connected by the protrusion.

According to an embodiment of the present application, the receiving portion is arranged in an edge region of the connecting portion.

According to an embodiment of the present application, the insulating plate includes a first region and a second region, a part of the second region is arranged as protruding from the first region, and the connecting portion is embedded inside the second region.

According to an embodiment of the present application, the connecting assembly includes two or more connecting pieces, the insulating plate includes a first buffering portion, and the first buffering portion is arranged between two adjacent connecting pieces.

According to an embodiment of the present application, the first buffering portion includes one elongated through hole, and a length direction of the through hole intersects a direction in which the two adjacent connecting pieces are arranged; or the first buffering portion includes two or more through holes, and the two or more through holes are arranged at intervals along a direction intersecting the direction in which the two adjacent connecting pieces are arranged; or the first buffering portion includes an elongated arc-shaped structure, and a length direction of the arc-shaped structure intersects the direction in which the two adjacent connecting pieces are arranged.

According to an embodiment of the present application, the connecting piece includes a second buffering portion, the second buffering portion and the connecting portion are spaced from each other, the insulating plate includes a third buffering portion arranged corresponding to the second buffering portion, and a part of the second buffering portion is embedded inside the third buffering portion.

According to an embodiment of the present application, the insulating plate further includes an elongated middle receiving recess, and at least one of two opposite sides of the middle receiving recess is provided with the connecting piece.

In another aspect, the present application provides a battery module, which includes:

two or more secondary batteries; the connecting assembly as described above, where the connecting assembly is arranged above the secondary batteries, and the secondary batteries are electrically connected by the connecting piece.

In yet another aspect, the present application provides an apparatus using a battery module as a power source, where the apparatus includes the battery module as described above, and the battery module is configured to provide electrical power.

In yet another aspect, the present application provides a method for manufacturing a connecting assembly, which includes: placing a connecting piece including a connecting portion in a predetermined mold; integrally forming an insulating plate around the connecting piece by a high-speed injection molding process, where the connecting portion and the insulating plate are connected to each other in a non-detachable manner to form an integral structure, and the connecting piece and the insulating plate constitute the connecting assembly.

According to an embodiment of the present application, before the placing a connecting piece including a connecting portion in a predetermined mold, the method according to the embodiments further includes forming an embedding through hole in the connecting portion of the connecting piece.

According to an embodiment of the present application, the integrally forming an insulating plate around the connecting piece by a high-speed injection molding process includes: forming a protrusion of the insulating plate penetrating through the embedding through hole, and making portions of the insulating plate located on upper and lower sides of the connecting portion connected by the protrusion.

BRIEF DESCRIPTION OF THE DRAWINGS

The drawings necessary for explaining embodiments are introduced briefly below to illustrate the technical solutions of the embodiments of the present application more clearly. Apparently, the drawings described below are merely some embodiments of the present application. Other drawings can be obtained by those with ordinary skill in the art from those drawings without any creative work.

FIG. 18 is a schematic diagram of a connection state between a connecting piece and an insulating plate according to another embodiment of the present application;

FIG. 19 is a schematic flowchart of a method for manufacturing a connecting assembly disclosed according to an embodiment of the present application;

Figure 1:
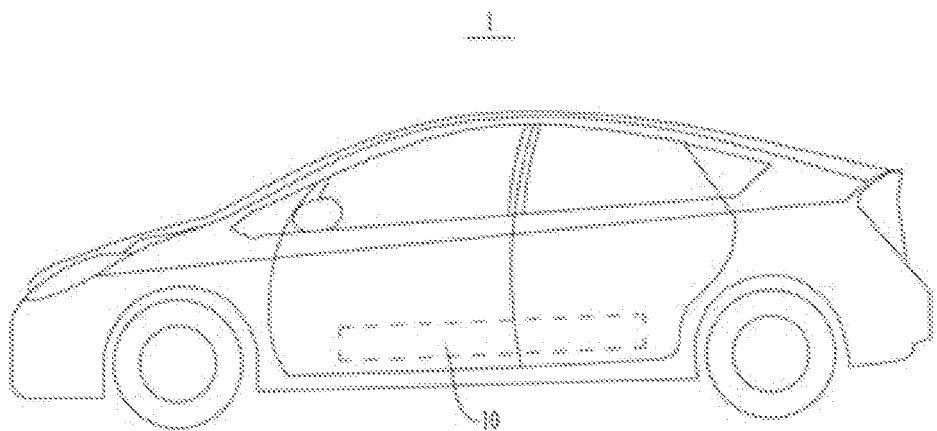
FIG. 1 is a schematic structural diagram of a vehicle disclosed according to an embodiment of the present application.

In the drawings, the drawings are not drawn to actual scale.

Reference signs: 1. Vehicle; 10. Battery pack; 20. Battery module; 30. Battery cell; 31. Secondary battery; 311. Electrode terminal; 40. Connecting assembly; 41. Connecting piece; 411. Connecting portion; 411a. Curved section; 411b. Straight section; 411c. Side surface; 4111. First connecting section; 4112. Intermediate transitioning section; 4113. Second connecting section; 412. Terminal connecting portion; 413. Second buffering portion; 42. Insulating plate; 42a. First region; 42b. Second region; 421. Through hole; 422. Middle receiving recess; 423. Partitioning portion; 424. First buffering portion; 424a. Through hole; 424b. Arc-shaped structure; 425. Third buffering portion; 50. Receiving portion; 51. Extending section; 60. Protrusion; 99. Electrode output plate; X. Length direction; Y. Width direction; Z. Thickness direction.

DETAILED DESCRIPTION

Implementations of the present application are described in further detail below with reference to the drawings and embodiments. The detailed description and drawings of the following embodiments are used to exemplarily illustrate the principles of the present application instead of limiting the scope of the present application. That is, the present application is not limited to the described embodiments.

In the description of the present application, it is to be noted that, unless otherwise specified, "multiple" means two or more. The terms "upper", "lower", "left", "right", "inner", "outer" indicate an orientation or positional relationship that is only for ease of describing the present application and to simplify the description, and do not indicate or imply that the referenced devices or elements must be in a particular orientation, or constructed and operated in a particular orientation, and therefore should not be construed as limiting the present application. In addition, the terms "first", "second", "third", and so on, are only for descriptive purposes, and cannot be understood as indicating or implying relative importance. "Vertical" dose not refer to strictly vertical, and instead, a tolerance of error is allowed. "Parallel" dose not refer to strictly parallel, and instead, a tolerance of error is allowed.

The orientation terms appearing in the following description all refer to orientations shown in the figures, and do not limit the specific structures in the present application. In the description of the present application, it should also be noted that, unless otherwise explicitly defined and specified, the terms "installation", "coupled", and "connection" should be understood in a broad sense. For example, those terms may refer to a fixed connection, a detachable connection, or an integral connection; those terms may refer to a direct connection or an indirect connection through an intermediate medium. For those of ordinary skill in the art, the specific meanings of the above-mentioned terms in the present application can be understood in accordance with specific conditions.

After the applicant noted the problem that the connecting piece and the insulating plate are liable to separate from each, the applicant conducted research and analysis on the structure of the battery module. In the related art, the connecting piece and the insulating plate are in a detachably connected manner. The connection stability between the connecting piece and the insulating plate is poor. During the use of the battery module, the battery module may vibrate. When the battery module vibrates, the connecting piece is subjected to vibration stress, so that the connecting piece will be loosened from the insulating plate, which makes the connecting piece be liable to be separated from the insulating plate.

Based on the above technical problems, the applicant made improvements to the connecting assembly used in the battery module.

For a better understanding of the present application, the embodiments of the present application will be described below in conjunction with FIG. 1 to FIG. 29.

The embodiments of the present application provide an apparatus using a battery module as a power source. The apparatus may be, but not limited to, a vehicle, a ship, or an aircraft. Referring to FIG. 1, an embodiment of the present application provides a vehicle 1 including a vehicle body and a battery module. The battery module is provided in the vehicle body. The vehicle 1 may be a pure electric vehicle, a hybrid electric vehicle, or a range-extended vehicle. The vehicle body is provided with a driving motor electrically connected to the battery module. The battery module provides electrical power to the driving motor. The driving motor is connected to wheels on the vehicle body through a transmission mechanism to drive the vehicle to travel. In an example, the battery module may be horizontally arranged at the bottom of the vehicle body.

Figure 2:
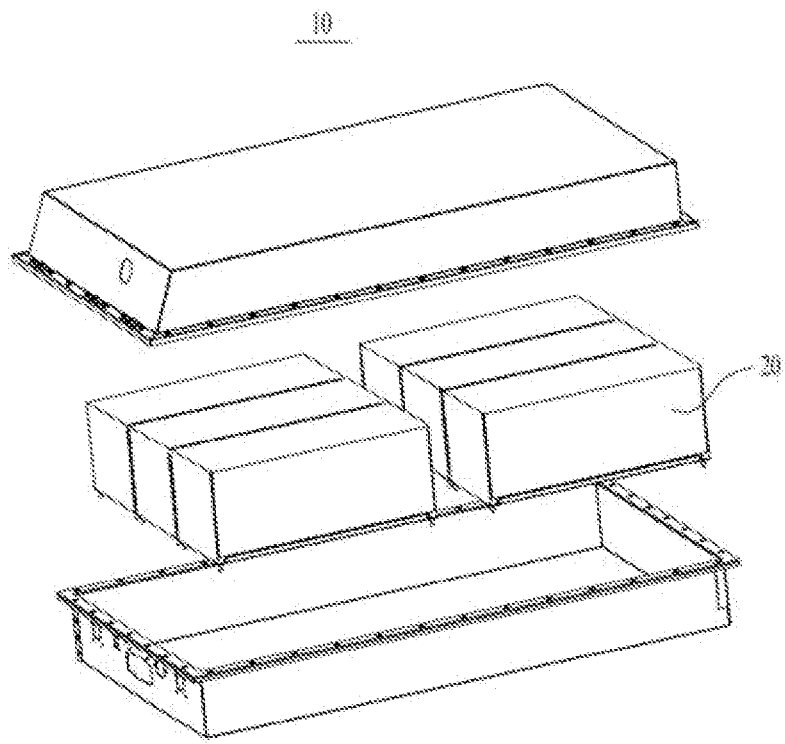
FIG. 2 is a schematic exploded structural diagram of a battery pack disclosed according to an embodiment of the present application.

As shown in FIG. 2, the battery module may be a battery pack 10. The battery pack 10 may be arranged in a variety of manners. In some optional embodiments, the battery pack 10 includes a casing body and a battery module 20 arranged in the casing body. The number of battery modules 20 is one or more. The one or more battery modules 20 are arranged in a casing body. The type of casing body is not limited. The casing body may be a frame-shaped casing body, a disk-shaped casing body, or a box-shaped casing body. In an example, the casing body may include a lower casing body configured to receive the battery module 20 and an upper casing body covering the lower box. The upper casing body and the lower casing body are closed with each other to form a receiving portion configured to receive the battery module 20.

It should be understood that, the battery module may be the battery module 20, that is, the battery module 20 is directly provided on the vehicle body.

Figure 3:
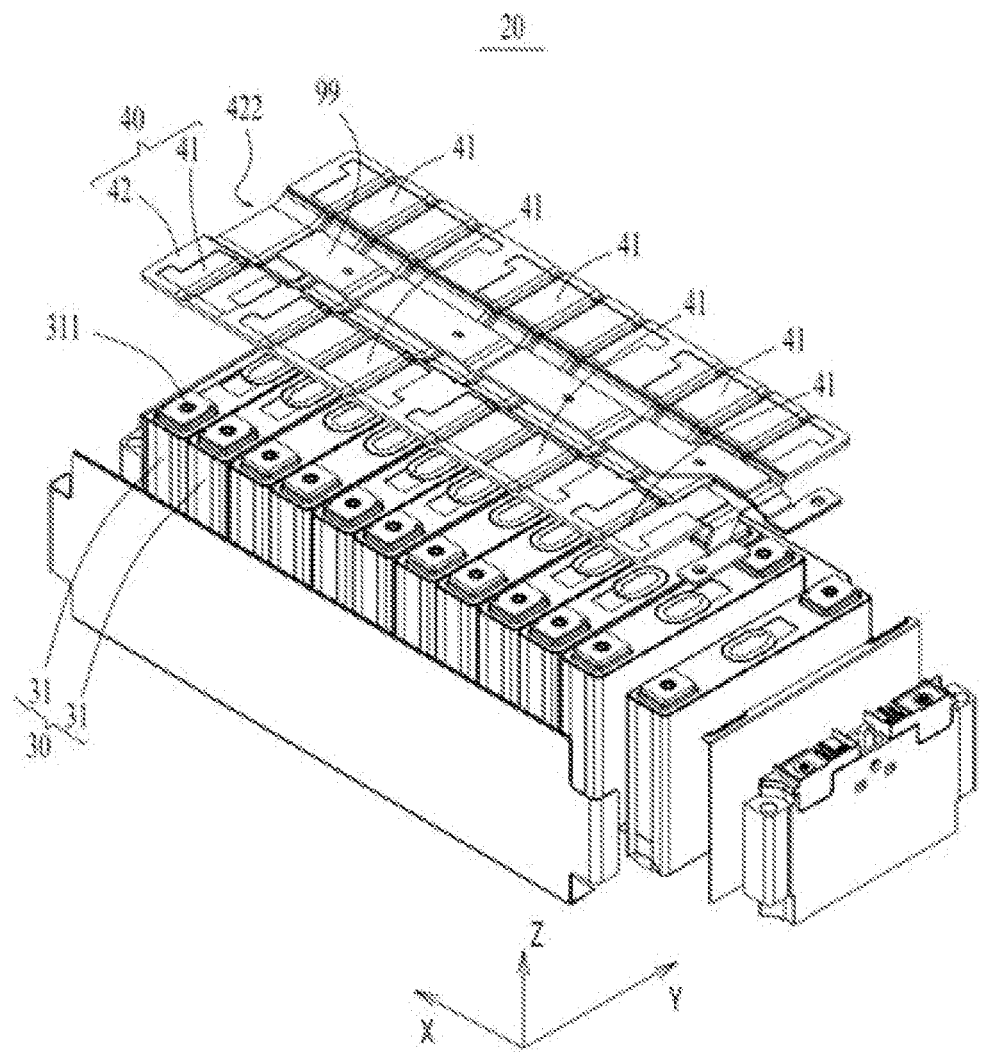
FIG. 3 is a schematic exploded structural diagram of a battery module disclosed according to an embodiment of the present application.

As shown in FIG. 3, the battery module 20 in this embodiment of the present application includes multiple battery cells 30 and a connecting assembly 40 arranged on the side where the battery cells 30 are provided. The connecting assembly 40 is arranged above the battery cells 30. The connecting assembly 40 includes a connecting piece 41 and an insulating plate 42. The insulating plate 42 itself is an integrally modeled structure. Here, the integrally modeled structure refers to a structure formed by one-time processing, rather than a structure formed by splicing two or more structural parts through hot pressing, welding, or other mechanical connecting processing. The battery module 20 may be arranged in a variety of manners. In an embodiment, the battery module 20 includes a receiving part and two or more battery cells 30 arranged side by side in the receiving part. The receiving part may be arranged in a variety of manners. For example, the receiving part includes side plates and end plates connected with one another in an enclosing manner. In some other embodiments, the receiving part includes a housing and a cover plate covering the housing.

Still referring to FIG. 3, each battery cell 30 includes two secondary batteries 31 arranged in parallel. Two adjacent battery cells 30 are connected in series with each other through a connecting piece 41 in the connecting assembly 40. The number of secondary batteries 31 included in each battery cell 30 is not limited to two, and each battery cell 30 may include one or three or more secondary batteries 31, which will not be limited here. In this embodiment, the outermost battery cell 30 includes a total output electrode. The battery module 20 includes an electrode output plate 99 connected to the total output electrode. One connecting piece 41 in the connecting assembly 40 is connected to the total output electrode of the battery module 20, and the electrode output plate 99 is connected to the connecting piece 41.

The secondary battery 31 in this embodiment of the present application includes a casing, an electrode assembly arranged in the casing, a top cover plate coupled with the casing in a sealing manner, and two electrode terminals 311 arranged on the top cover plate and drawn from a same side. The connecting assembly 40 is arranged on the side of the secondary battery 31 where the electrode terminals 311 are provided. One of the two electrode terminals 311 serves as a positive electrode, and the other serves as a negative electrode. The two electrode terminals 311 are arranged at intervals along a width direction Y of the insulating plate 42. When the battery cells 30 are arranged side by side along a length direction X of the insulating plate 42, the two electrode terminals 311 of each secondary battery 31 are arranged to form two columns of electrode terminal groups, and a receiving gap extending along the length direction X exists between the two columns of electrode terminal groups. In an example, the electrode terminals 311 of the secondary battery 31 has a columnar structure.

Referring to FIG. 3 to FIG. 6, the connecting piece 41 in the embodiment of the present application includes a connecting portion 411 and a terminal connecting portion 412. The terminal connecting portion 412 is configured to be connected with the electrode terminals 311 of the secondary battery 31. The insulating plate 42 includes a through hole 421 extending in a thickness direction Z of the insulating plate 42. A position of the connecting piece 41 is arranged corresponding to a position of the through hole 421. The connecting piece 41 is embedded in the insulating plate 42 by the connecting portion 411, so that the connecting portion 411 of the connecting piece 41 is embedded inside the insulating plate 42, and therefore, the connecting piece 41 and the insulating plate 42 are connected in an embedded manner to form an integral structure. Here, the integral structure refers to a non-detachable integral structure formed by the connecting piece 41 and the insulating plate 42 when they are connected in an embedded manner. When the connecting piece 41 and the insulating plate 42 required to be separated, the structural integrity of one of them have to be broken. The insulating plate 42 can restrict the movement of the connecting piece 41. The connecting portion 411 of the connecting piece 41 is embedded inside the insulating plate 42, that is, the insulating plate 42 encloses at least a part of the connecting portion 411 of the connecting piece 41. In some embodiments, the insulating plate 42 encloses the connecting portion 411 of the connecting piece 41 so that the connecting portion 411 cannot be seen by naked eyes when the connecting assembly 40 is viewed from the outside. An orthographic projection of the terminal connecting portion 412 in the thickness direction Z is within an orthographic projection of a hole wall of the through hole 421 in the thickness direction Z, so that the terminal connecting portion 412 is exposed to the external environment, and the terminal connecting portion 412 is not covered by the insulating plate 42, which facilitates the connection between the terminal connecting portion 412 and the electrode terminals 311. In the assembling of the connecting assembly 40 and the battery cell 30, the connecting assembly 40 is placed on one side of the battery cell 30, and the terminal connecting portion 412 and the electrode terminal 311 are arranged correspondingly in the thickness direction Z, and then the electrode terminal 311 and the terminal connecting portion 412 are connected. In an example, the electrode terminal 311 and the terminal connecting portion 412 are connected by welding.

The connecting assembly 40 in this embodiment of the present application includes an insulating plate 42 and a connecting piece 41. The insulating plate 42 itself is an integrally modeled structure. The connecting portion of the connecting piece 41 is embedded in the insulating plate 42. The connecting piece 41 is connected with the insulating plate 42 in an embedded manner by the connecting portion 411, so that the connecting piece 41 and the insulating plate 42 form a non-detachable integral structure. The insulating plate 42 includes a through hole 421, and the terminal connecting portion 412 of the connecting piece 41 is arranged corresponding to the through hole 421, so that the terminal connecting portion 412 is exposed to the external environment, which facilitates the fixed connection between the terminal connecting portion 412 and the electrode terminal 311 of the secondary battery 31. Two adjacent battery cells 30 may be electrically connected by the connecting piece 41. Since the connecting piece 41 and the insulating plate 42 are connected in an embedded manner to form an integral structure, the connection state between the connecting piece and the insulating plate is reliable and stable, and the connection structure is robust. Therefore, when vibration occurs during the use of the battery module 20, the connecting piece 41 is effectively restricted by the insulating plate 42. Thus, the possibility of the connecting piece 41 being separated from the insulating plate 42 due to vibration stress can be reduced, and the safety of the battery module 20 during use can be ensured. In addition, during the transportation of the connecting assembly 40, the connecting piece 41 is not liable to fall off from the insulating plate 42, which reduces the possibility of the connecting piece 41 being lost or damaged. Since the connecting piece 41 is fixedly connected to the insulating plate 42 so that the position of the connecting piece 41 is fixed, the possibility that the connecting piece 41 is difficult to connect to the electrode terminal 311 due to the deviation of the connecting piece 41 from the predetermined assembly position can also be reduced, which helps to improve assembly quality and assembly efficiency.

Figure 4:
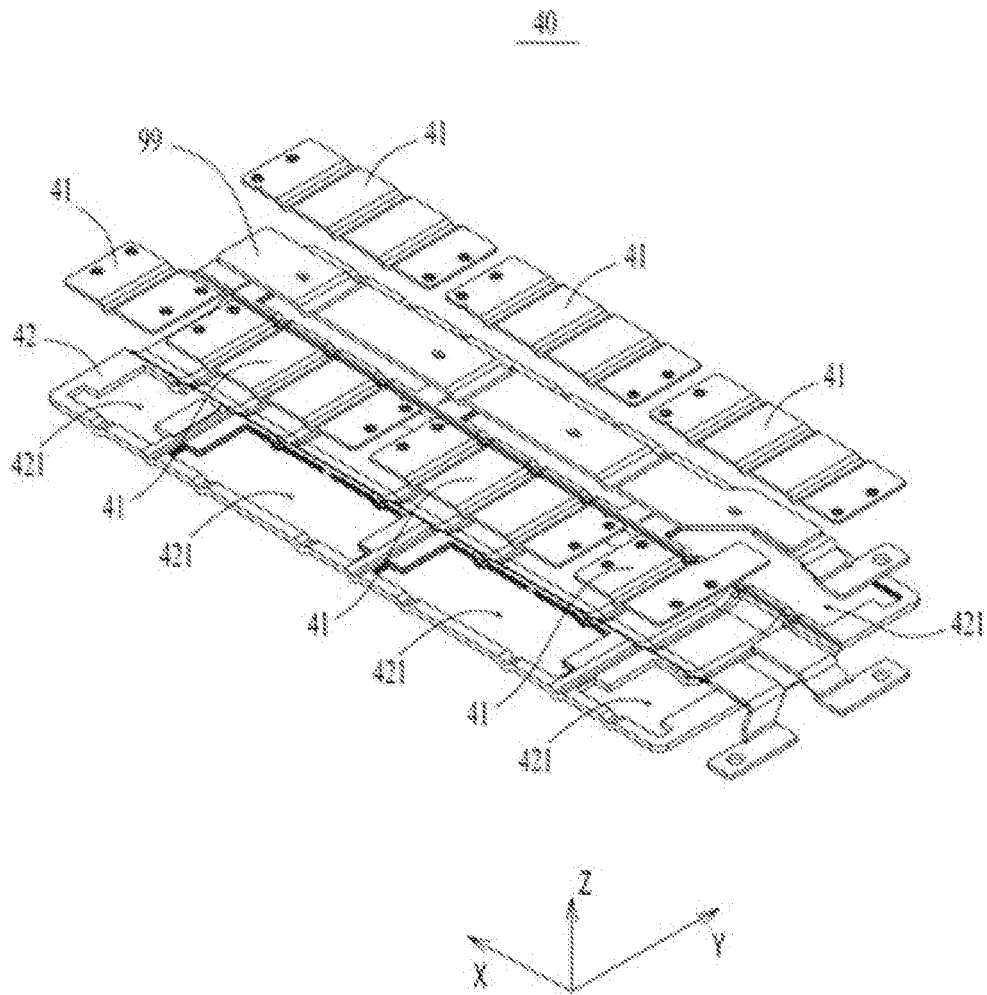
FIG. 4 is a schematic exploded structural diagram of a connecting assembly disclosed according to an embodiment of the present application.
Figure 5:
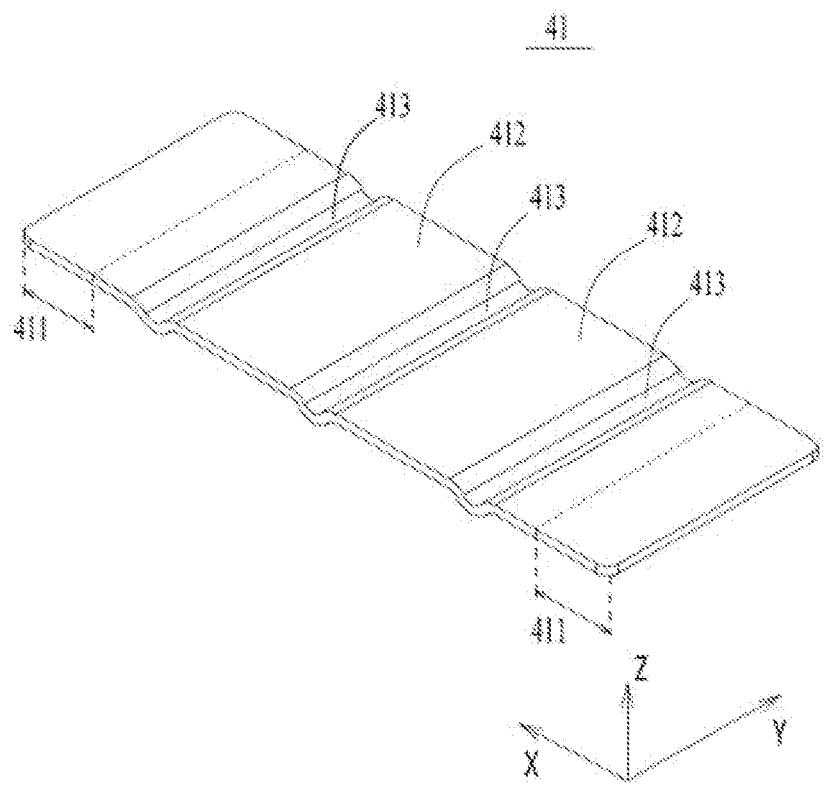
FIG. 5 is a schematic structural diagram of a connecting piece disclosed according to an embodiment of the present application.
Figure 6:
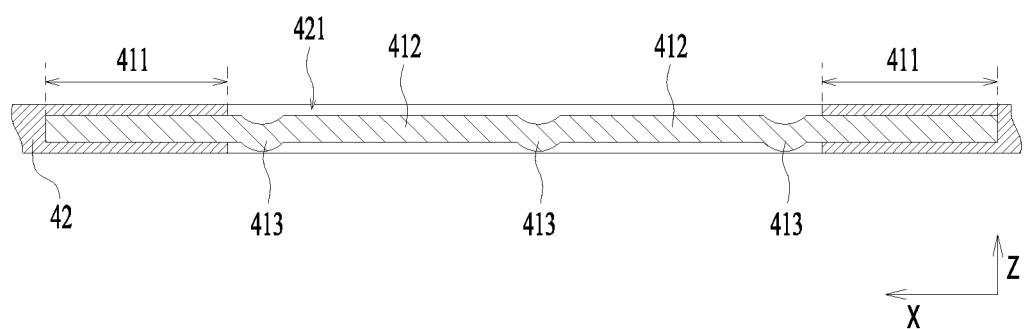
FIG. 6 is a schematic diagram of a connection state between the connecting piece and the insulating plate according to the embodiment as shown in FIG. 5.

In an embodiment, referring to FIG. 4 to FIG. 6, along the length direction X of the insulating plate 42, each of two opposite sides of the terminal connecting portion 412 is provided with connecting portions 411, that is, each of the two opposite ends of the connecting piece 41 is provided with one connecting portion 411. The connecting piece 41 is embedded in the insulating plate 42 by the two connecting portions 411. The connecting portion 411 has a flat plate-shaped structure. It can be understood that, an arrangement of the connecting portion 411 on one of the two opposite sides of the terminal connecting portion 412 can also realize that the insulating plate 42 restricts the connecting piece 41.

Figure 7:
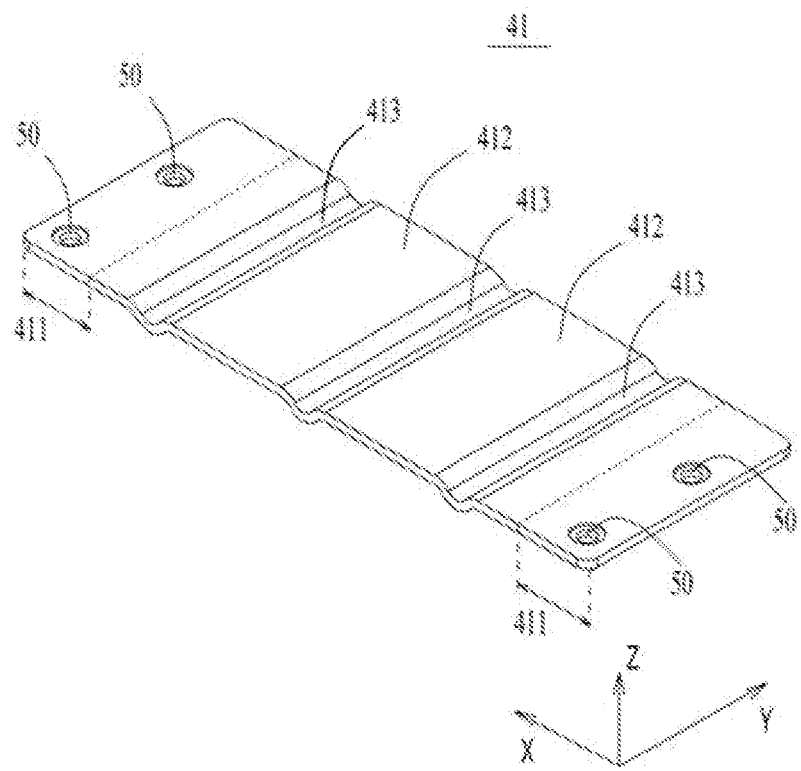
FIG. 7 is a schematic structural diagram of a connecting piece disclosed according to another embodiment of the present application.
Figure 8:
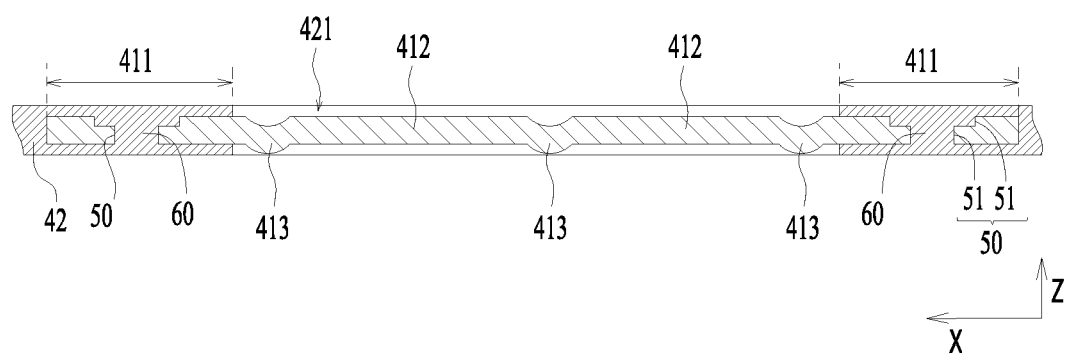
FIG. 8 is a schematic diagram of a connection state between the connecting piece and the insulating plate according to the embodiment as shown in FIG. 7.

In an embodiment, referring to FIG. 7 and FIG. 8, the connecting portion 411 of the connecting piece 41 is provided with a receiving portion 50, and the insulating plate 42 is provided with a protrusion 60. The protrusion 60 of the insulating plate 42 is embedded in the receiving portion 50 of the connecting portion 411, thereby helping to further improve the connection strength between the connecting piece 41 and the insulating plate 42 and reducing the possibility of the connecting piece 41 and the insulating plate 42 being liable to be separated from each other. The shape of the protrusion 60 matches the shape of the receiving portion 50. When the secondary battery 31 swells, the connecting piece 41 is subject to tensile stress along the length direction X of the insulating plate 42. When the secondary battery 31 vibrates in the length direction X of the insulating plate 42, the connecting piece 41 is subject to tensile or compressive stress along the length direction X of the insulating plate 42. When the connecting piece 41 is subject to the tensile or compressive stress along the length direction X of the insulating plate 42, the protrusion 60 can effectively restrict the displacement of the connecting piece 41 by the receiving portion 50, so that the connecting piece 41 and the insulating plate 42 are not liable to be displaced and the adjoining surfaces of the connecting piece 41 and the insulating plate 42 are not liable to split and separate from each other. The number of the receiving portions 50 and the number of the protrusions 60 are provided in one-to-one correspondence. The shape of the receiving portion 50 matches the shape of the protrusion 60. In an example, along the length direction X of the insulating plate 42, each of the two opposite sides of the terminal connecting portion 412 is provided with a connecting portion 411, that is, the two opposite ends of the connecting piece 41 each includes a connecting portion 411. Each connecting portion 411 is provided with two receiving portions 50. The two receiving portions 50 are arranged at intervals along the width direction Y of the insulating plate 42. It can be understood that, the number of receiving portions 50 provided on each connecting portion 411 is not limited to two, and may also be three or more.

In an embodiment, referring to FIG. 8, the receiving portion 50 is an embedding through hole extending in the thickness direction Z. The protrusion 60 penetrates through the receiving portion 50, so that portions of the insulating plate 42 on the upper and lower sides of the connecting portion 411 can be connected by the protrusion 60. In the thickness direction Z of the insulating plate 42, when the upper surface and the lower surface of the connecting piece 41 each are disconnected from the insulating plate 42, the protrusion 60 can still restrict the connecting piece 41 by the receiving portion 50, and thus the possibility of the connecting piece 41 falling off from the insulating plate 42 or position shifting of the connecting piece 41 can be reduced.

Figure 9:
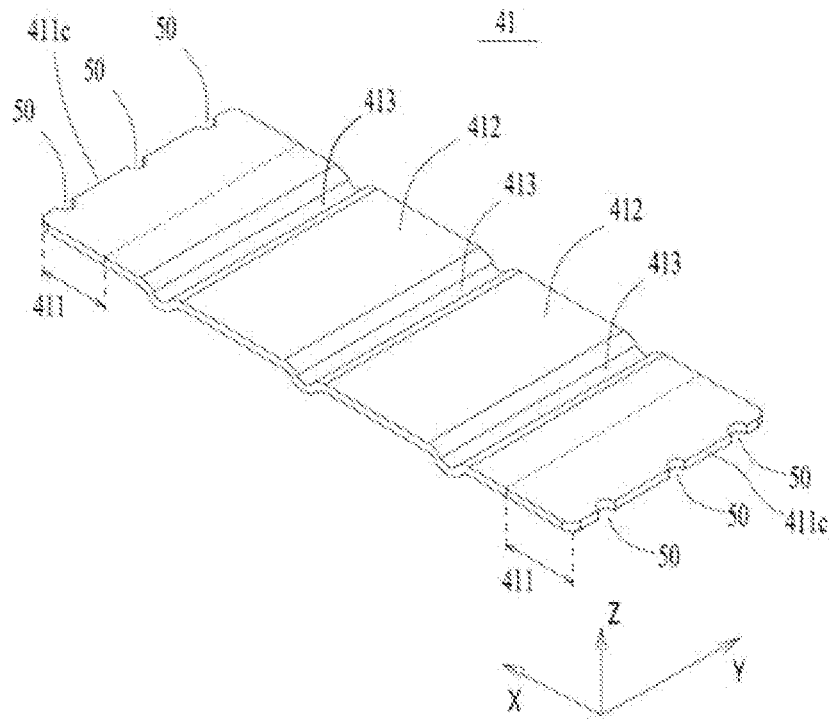
FIG. 9 is a schematic structural diagram of a connecting piece disclosed according to another embodiment of the present application.

In another embodiment, as shown in FIG. 9, the receiving portion 50 is a groove extending along the thickness direction Z. The connecting piece 41 includes two opposite end faces in the length direction X of the insulating plate 42. The groove is recessed from the end surface in a direction approaching the terminal connecting portion 412. A part of the insulating plate 42 extends into the groove to form a protrusion 60. When the connecting piece 41 is subject to the tensile or compressive stress along the width direction Y of the insulating plate 42, the protrusion 60 can effectively restrict the connecting piece 41 by the receiving portion 50, so that the connecting piece 41 and the insulating plate 42 are not liable to be displaced along the width direction Y of the insulating plate and the adjoining surfaces of the connecting piece 41 and the insulating plate 42 are not liable to split and separate from each other.

In an embodiment, the receiving portion 50 includes two or more extending sections 51. Two or more extending sections 51 are arranged along the direction in which the receiving portion 50 is recessed. An orthographic projection of one of two adjacent extending sections 51 is within an orthographic projection of the other. There is a transitioning region between two adjacent extending sections 51. In an example, as shown in FIG. 8, the receiving portion 50 is an embedding through hole extending in the thickness direction Z. The embedding through hole is a stepped hole. The embedding through hole includes two extending sections 51 arranged along the thickness direction Z. In another example, as shown in FIG. 9, the receiving portion 50 is a groove extending along the thickness direction Z. For example, the groove is a stepped groove (not shown), so that the groove includes two extending sections 51 arranged along the thickness direction Z.

In an embodiment, referring to FIG. 9, the receiving portion 50 is arranged in an edge region of the connecting portion 411. The edge region of the connecting portion 411 includes a side surface 411c of the connecting portion 411 and a region close to the side surface 411c. The side surface 411c of the connecting portion 411 refers to a surface parallel to the thickness direction Z.

In an embodiment, the connecting portion 411 of the connecting piece 41 is provided with a protrusion 60, and the insulating plate 42 is provided with a receiving portion 50, which can also achieve the effect of improving the connection strength between the connecting piece 41 and the insulating plate 42.

Figure 10:
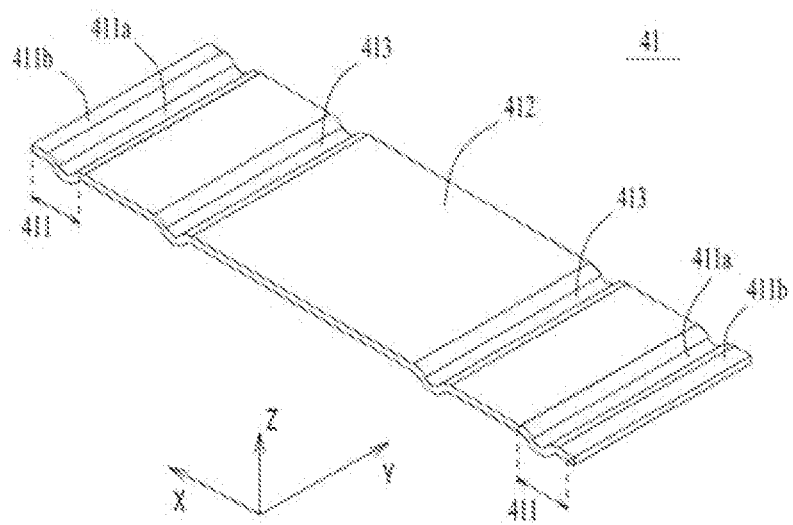
FIG. 10 is a schematic structural diagram of a connecting piece disclosed according to another embodiment of the present application.
Figure 11:
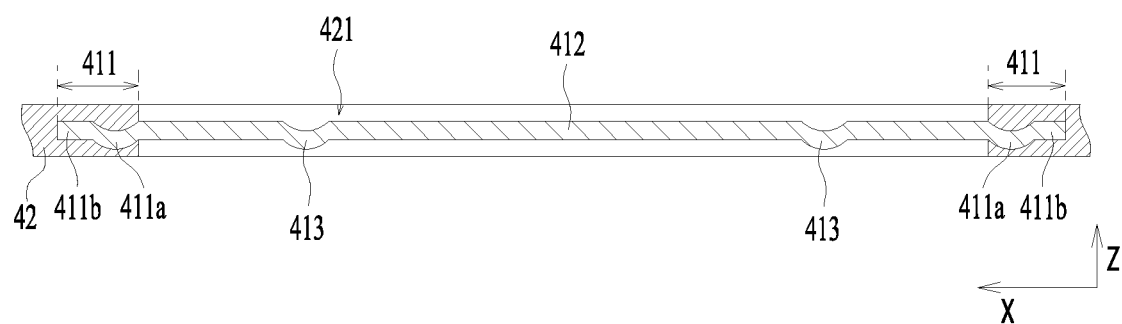
FIG. 11 is a schematic diagram of a connection state between the connecting piece and the insulating plate according to the embodiment as shown in FIG. 10.
Figure 12:
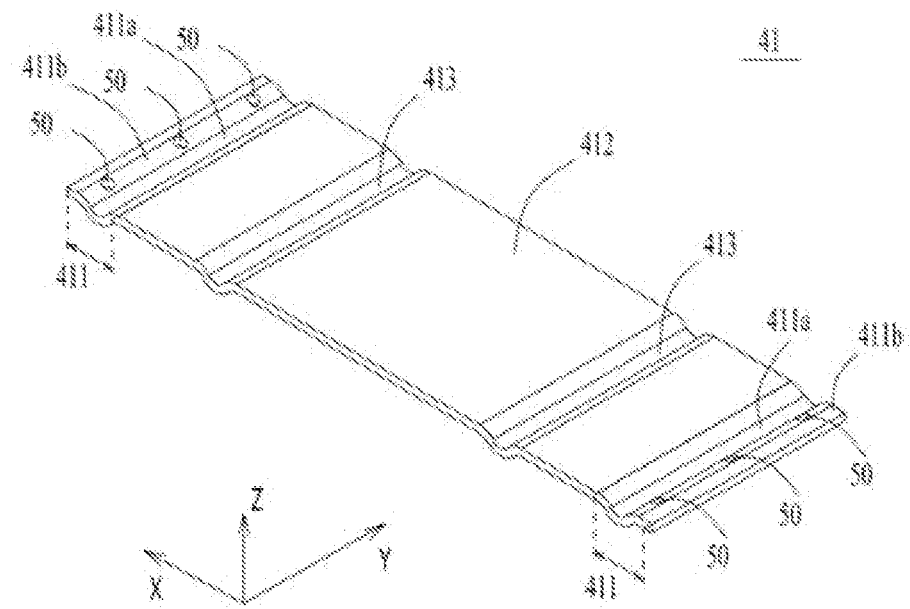
FIG. 12 is a schematic structural diagram of a connecting piece disclosed according to another embodiment of the present application.

In an embodiment, referring to FIG. 10 and FIG. 11, the connecting portion 411 of the connecting piece 41 includes a curved section 411a and a straight section 411b. The straight section 411b of the connecting portion 411 is connected to the terminal connecting portion 412. The curved section 411a of the connecting portion 411 forms a recessed space, and a part of the insulating plate 42 extends into the recessed space, thereby helping to further improve the connection strength between the connecting piece 41 and the insulating plate 42. When the connecting piece 41 is subjected to tensile or compressive stress along the length direction X of the insulating plate 42, the part of the insulating plate 42 extending into the recessed space can effectively restrict the connecting piece 41 by the curved section 411a, so that the connecting piece 41 and the insulating plate 42 are not liable to be displaced along the length direction X of the insulating plates 42 and the adjoining surfaces of the connecting piece 41 and the insulating plate 42 are not liable to split or separated from each other. In an example, the number of curved sections 411a is one or two or more. When the number of the curved sections 411a is two or more, the two or more curved sections 411a may be arranged at intervals along the width direction Y of the insulating plate 42. For example, the curved section 411a has a circular arc-shaped structure. In an example, as shown in FIG. 12, the curved section 411a is provided with a receiving portion 50, and the insulating plate 42 is correspondingly provided with a protrusion 60, so that the connection strength and connection stability between the connecting piece 41 and the insulating plate 42 can be further improved. For example, the receiving portion 50 may be a straight hole or a stepped hole, or a groove. It can be understood that, the curved section 411a is provided with the protrusion 60, and the insulating plate 42 is correspondingly provided with the receiving portion 50, which can also realizes the fixed connection between the connecting piece 41 and the insulating plate 42.

Figure 13:
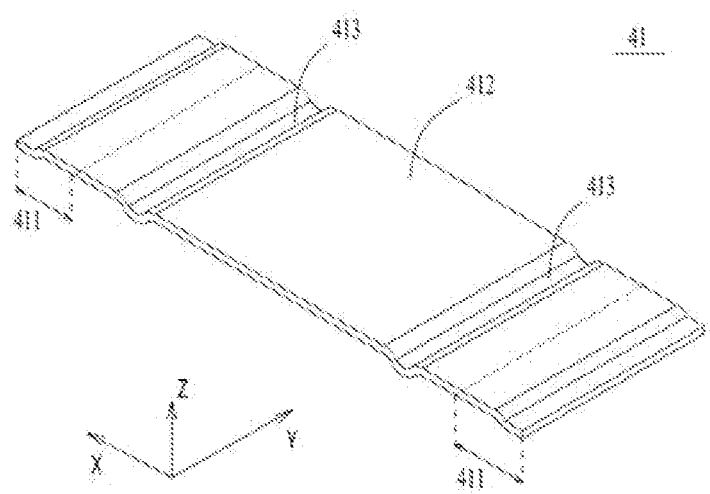
FIG. 13 is a schematic structural diagram of a connecting piece disclosed according to another embodiment of the present application.
Figure 14:
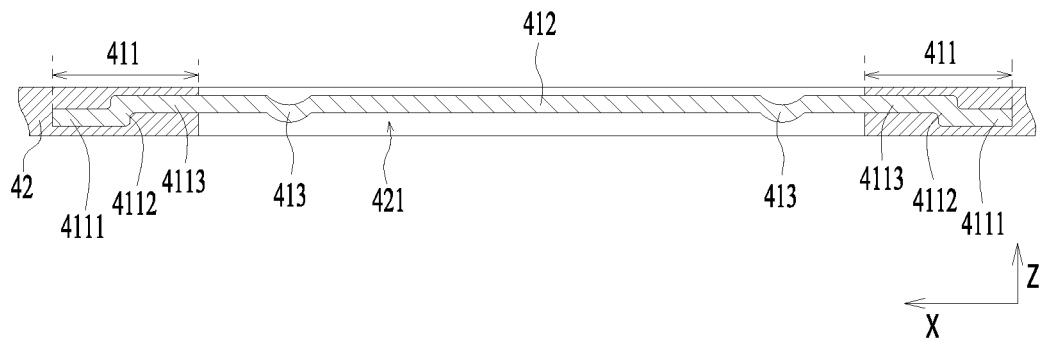
FIG. 14 is a schematic diagram of a connection state between the connecting piece and the insulating plate according to the embodiment as shown in FIG. 13.
Figure 15:
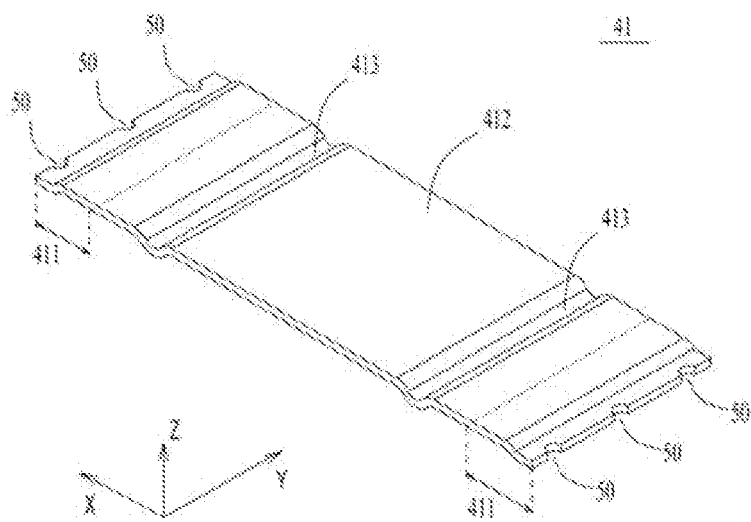
FIG. 15 is a schematic structural diagram of a connecting piece disclosed according to another embodiment of the present application.

In an embodiment, referring to FIG. 13 and FIG. 14, the connecting portion 411 includes a first connecting section 4111, a middle transitioning section 4112, and a second connecting section 4113 that are connected. The first connecting section 4111 and the second connecting section 4113 are arranged offset to each other in the thickness direction Z, so that the connecting portion 411 has a stepped structure as a whole. The connecting portion 411 is connected with the terminal connecting portion 412 by the second connecting section 4113. When the connecting piece 41 is subjected to tensile or compressive stress along the length direction X of the insulating plate 42, the insulating plate 42 can effectively restrict the connecting piece 41 by the middle transitioning section 4112, so that the connecting piece 41 and the insulating plate 42 are not liable to be displaced along the length direction X of the insulating plates 42 and the adjoining surfaces of the connecting piece 41 and the insulating plate 42 are not liable to split or separated from each other. In an example, both of the first connecting section 4111 and the second connecting section 4113 extend along the length direction X of the insulating plate 42 and are arranged in parallel, and the middle transitioning section 4112 extends along the thickness direction Z of the insulating plate 42 and is perpendicular to the first connecting section 4111 and the second connecting section 4113. In an example, as shown in FIG. 15, the first connecting section 4111 is provided with a receiving portion 50, and the insulating plate 42 is correspondingly provided with a protrusion 60, so that the connection strength and connection stability between the connecting piece 41 and the insulating plate 42 can be further improved. For example, the receiving portion 50 may be a straight hole or a stepped hole, or a groove. It can be understood that, the first connecting section 4111 is provided with the protrusion 60, and the insulating plate 42 is correspondingly provided with the receiving portion 50, which can also realizes the fixed connection between the connecting piece 41 and the insulating plate 42.

Figure 16:
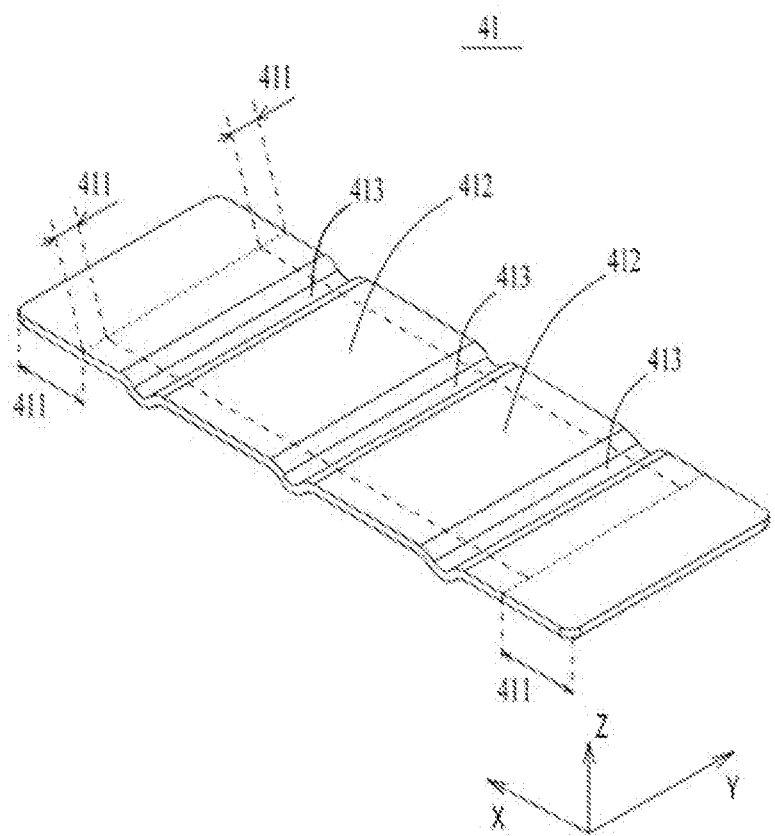
FIG. 16 is a schematic structural diagram of a connecting piece disclosed according to yet another embodiment of the present application.
Figure 17:
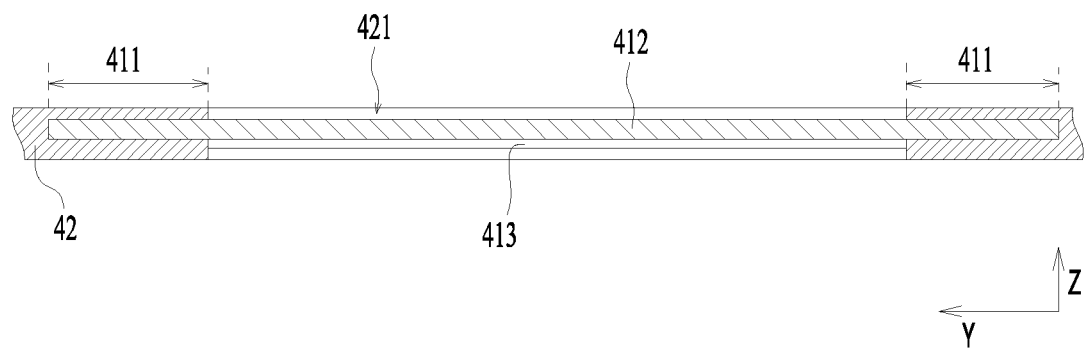
FIG. 17 is a schematic diagram of a connection state between the connecting piece and the insulating plate according to the embodiment as shown in FIG. 16.

In an embodiment, referring to FIG. 16 and FIG. 17, along the width direction Y of the insulating plate 42, the two opposite sides of the terminal connecting portion 412 are respectively provided with connecting portions 411, which can also realize that the connecting piece 41 and the insulating plate 42 are connected to form an integral structure, and the connection strength between the connecting piece 41 and the insulating plate 42 is improved. It can be understood that, along the width direction Y of the insulating plate 42, one of the two opposite sides of the terminal connecting portion 412 is provided with a connecting portion 411, which can also ensure that the insulating plate 42 restricts the connecting piece 41. For example, the connecting piece 41 has a rectangular structure.

In an example, along the width direction Y of the insulating plate 42, the two opposite sides of the terminal connecting portion 412 are respectively provided with connecting portions 411, and along the length direction X of the insulating plate 42, the two opposite sides of the terminal connecting portion 412 are also respectively provided with connecting portions 411, so that the four connecting portions 411 are enclosed to form a ring structure, and the terminal connecting portion 412 is surrounded by the four connecting portions 411.

In an embodiment, along the thickness direction Z of the insulating plate 42, the terminal connecting portion 412 is arranged in the through hole 421, and the connecting portion 411 of the connecting piece 41 penetrates the hole wall of the through hole 421 and is embedded into the insulating plate 42, so that the upper surface and the lower surface of the insulating plate 42 in the thickness direction Z protrude from the upper surface and the lower surface of the terminal connecting portion 412, respectively. The lower surface of the terminal connecting portion 412 is configured to be electrically connected with the electrode terminal 311 of the secondary battery 31.

In an embodiment, referring to FIG. 3, the insulating plate 42 includes a middle receiving recess 422. The middle receiving recess 422 extends along the length direction X of the insulating plate 42. When the connecting assembly 40 is applied to the battery module 20, the electrode output plate 99 can be at least partially received in the middle receiving recess 422, thereby reducing the space occupancy by the electrode output plate 99 and improving the structural compactness of the battery module 20, which improves the energy density of the secondary battery 31. In an example, when the connecting assembly 40 is applied to the battery module 20, the middle receiving recess 422 is recessed toward a direction approaching the secondary battery 31. Along the width direction Y of the insulating plate 42, the two opposite sides of the middle receiving recess 422 are provided with through holes 421. Each of the two opposite sides of the middle receiving recess 422 is provided with two or more through holes 421. The two or more through holes 421 located on the same side are arranged at intervals along the length direction X of the insulating plate 42. One connecting piece 41 is provided corresponding to each through hole 421. In other embodiments, one of the two opposite sides of the middle receiving recess 422 is provided with a through hole 421.

In an embodiment, referring to FIG. 5, the connecting piece 41 includes a second buffering portion 413. The second buffering portion 413 can absorb and buffer external stress through its own deformation. The number of terminal connecting portions 412 is two or more. A second buffering portion 413 is arranged between two adjacent terminal connecting portions 412. After the terminal connecting portion 412 and the electrode terminal 311 are fixedly connected, when the secondary battery 31 swells and deforms, two adjacent terminal connecting portions 412 tend to move away from each other, thereby applying tensile stress to the second buffering portion 413. When the second buffering portion 413 is subjected to tensile stress, it will be elongated to buffer the tensile stress, thereby reducing the tensile stress received between the terminal connecting portion 412 and the electrode terminal 311, and reducing the possibility of the terminal connecting portion 412 and the electrode terminal 311 being cracked and separated from each other due to overly large tensile stress received therebetween, and the possibility of the joint between the connecting portion 411 of the connecting piece 41 and the insulating plate 42 being cracked and separated from each other due to overly large external stress received between the connecting portion 411 of the connecting piece 41 and the insulating plate 42 can also be reduced. In another embodiment, a second buffering portion 413 is provided between the terminal connecting portion 412 and the connecting portion 411. When the secondary battery 31 swells and deforms, two adjacent terminal connecting portions 412 tend to move away from each other, and the terminal connecting portion 412 and the connecting portion 411 tend to approach each other, so that the second buffering portion 413 between the terminal connecting portion 412 and the connecting portion 411 is subject to compressive stress. When the second buffering portion 413 is subjected to the compressive stress, it will be compressed to buffer the compressive stress, thereby reducing the possibility of the joint between the connecting portion 411 of the connecting piece 41 and the insulating plate 42 being cracked and split due to overly large external stress received between the connecting portion 411 of the connecting piece 41 and the insulating plate 42. In an example, the second buffering portion 413 is an arc-shaped structure protruding along the thickness direction Z of the insulating plate 42. In some embodiments, the second buffering portion 413 has a circular arc-shaped structure.

In an embodiment, referring to FIG. 18, the insulating plate 42 includes a first region 42a and a second region 42b. A part of the second region 42b protrudes from the first region 42a, so that rigidity of the first region 42a is less than rigidity of the second region 42b, and therefore elastic deformation ability of the first region 42a is better than that of the second region 42b. The portion of the second region 42b protruding from the first region 42a forms a boss. The connecting portion 411 is embedded inside the second region 42b. Along the thickness direction Z, the connecting portion and the second region 42b are correspondingly arranged. In an example, the second region 42b is arranged around the through hole 421.

Referring to FIG. 19, the embodiments of the present application further provide a method for manufacturing a connecting assembly 40, which includes:

placing a connecting piece 41 including a terminal connecting portion 412 in a predetermined mold;

integrally forming an insulating plate 42 around the connecting piece 41 by a high-speed injection molding process, where the connecting portion 411 and the insulating plate 42 are connected to each other in a non-detachable manner to form an integral structure, and the connecting piece 41 and the insulating plate 42 constitute the connecting assembly 40.

In an embodiment, the connecting piece 41 and the insulating plate 42 are connected with each other in an embedded manner to form an integral structure. The connecting piece 41 and the insulating plate 42 constitute the connecting assembly 40. A region of the insulating plate 42 corresponding to the connecting piece 41 includes a through hole 421. An orthographic projection of the terminal connecting portion 412 in the thickness direction Z of the insulating plate 42 is within an orthographic projection of the hole wall of the through hole 421 in the thickness direction Z.

In an embodiment, the part of the connecting piece 41 embedded in the insulating plate 42 forms the connecting portion 411. The connecting piece 41 is an integrally modeled structure. The connecting piece 41 may be modeled by casting or stamping. The material of the connecting piece 41 may be a conductive material such as aluminum or aluminum alloy. The insulating plate 42 is an integrally modeled structure. In an example, the insulating plate 42 is an injection molded structure molded by a high-speed injection molding process. By the high-speed injection molding process, the insulating plate 42 can be injection-molded on the outside of the connecting piece 41 at one time, so that the insulating plate 42 has high rigidity and the structure of the insulating plate 42 is not easily damaged. The thickness of the insulating plate 42 formed by the high-speed injection molding process may be controlled to be 0.1 mm to 0.8 mm, which helps to lighten the overall structure of the connecting assembly 40, and helps to increase the energy density of the battery module 20. In the process of manufacturing the insulating plate 42, the requirements of high-speed injection molding process are the follows: a molding rate is greater than or equal to 200 m/s; a molding temperature is greater than or equal to 250° C., so that the plastic is heated to a fluid state. For example, the material of the insulating plate 42 may be polypropylene (PP), polycarbonate (PC), engineering plastic alloy (PC+ABS), etc. with high fluidity.

In an embodiment, before the placing a connecting piece 41 including a connecting portion 411 in a predetermined mold, the method according to the embodiments further includes forming an embedding through hole in the connecting portion 411 of the connecting piece 41.

In an embodiment of the present application, the integrally forming an insulating plate 42 around the connecting piece 41 by a high-speed injection molding process includes: forming a protrusion 60 of the insulating plate 42 penetrating through the embedded through hole, and making portions of the insulating plate 42 located on upper and lower sides of the connecting portion 411 connected by the protrusion 60.

In the method for manufacturing the connecting assembly 40 according to the embodiments of the present application, a high-speed injection molding process is performed to form the insulating plate 42 around the connecting piece 41 at one time, and to make a part of the connecting piece 41 embedded inside the insulating plate 42, so that the connecting piece 41 and the insulating plate 42 are connected in an embedded manner to form an integral structure, which ensures that the connection state between the connecting piece and the insulating plate is reliable and stable, and the connection structure is robust. Therefore, when vibration occurs during the use of the battery module 20, the connecting piece 41 is effectively restricted by the insulating plate 42. Thus, the possibility of the connecting piece 41 being separated from the insulating plate 42 due to overly big vibration stress received by the connecting piece 41 can be reduced, and the safety of the battery module 20 during use can be ensured.

In addition, by manufacturing the insulating plate 42 using a high-speed injection molding process, the thickness of the insulating plate 42 can be controlled to be 0.4 mm to 0.8 mm on the premise that the rigidity requirements of the insulating plate 42 are met, which helps to lighten the overall structure of the connecting assembly 40 and increase the energy density of the battery module 20.

In an embodiment, the number of connecting pieces 41 is two or more. The insulating plate 42 includes a first buffering portion 424. A first buffering portion 424 is provided between two adjacent connecting pieces 41. Further, referring to FIG. 20, the insulating plate 42 according to the embodiments of the present application further includes a partitioning portion 423 and a first buffering portion 424. Two adjacent through holes 421 may be grouped into a set of through holes 421. The partitioning portion 423 partitions two adjacent through holes 421. The partitioning portion 423 is provided with a first buffering portion 424. When the first buffering portion 424 is subjected to an external force, it can be stretched or compressed to buffer the external stress. The rigidity of the region where the first buffering portion 424 is arranged is reduced, which makes the region more flexible and easy to deform. Since the connecting piece 41 is connected to the insulating plate 42 in an embedded manner, the connecting piece 41 may be manufactured first in the process of manufacturing the connecting assembly, and then the connecting piece 41 may be placed in a predetermined position, and the insulating plate 42 may be manufactured around the connecting piece 41. In the manufactured connecting assembly, the connecting piece 41 itself cannot move, so the relative position of the connecting piece 41 with the insulating plate 42 cannot be adjusted by moving the position of its own. In the process of manufacturing the connecting assembly, the position of the connecting piece 41 itself may deviate from the predetermined position, which causes the position of the connecting piece 41 to deviate from the predetermined position when the connecting piece 41 and the insulating plate 42 form an integral structure. When the connecting piece 41 and the electrode terminal 311 of the secondary battery 31 are subsequently connected, the connecting position between the connecting piece 41 and the electrode terminal 311 deviates from the predetermined position because the connecting piece 41 deviates from the predetermined position. However, since the partitioning portion 423 in the embodiments of the present application is provided with the first buffering portion 424, during the connection process of the connecting piece 41 with the electrode terminal 311, the first buffering portion 424 can be stretched or compressed to make two adjacent connecting pieces 41 move away from or approach each other so as to adjust the positions of two adjacent connecting pieces 41, so that the position error of the connecting piece 41 during the manufacturing process can be compensated for, which makes it easy to adjust the connecting piece 41 to a predetermined position and fixedly connect the connecting piece 41 to the electrode terminal 311. In addition, because of the provision of the first buffering portion 424, the position of the connecting piece 41 can be flexibly adjusted later. Therefore, in the process of manufacturing the connecting piece 41 and the insulating plate 42, the position precision of the connecting piece 41 and the position of the connecting piece 41 and the manufacturing tolerance requirements of the connecting piece 41 and the insulating plate 42 are reduced, which helps to reduce the manufacturing difficulty of the connecting assembly.

In an embodiment, during use of the battery module 20, the secondary battery 31 in the battery cell 30 may swell and deform. When the secondary battery 31 swells and deforms, two adjacent connecting pieces 41 may be far away from each other, so that tensile stress is applied to the first buffering portion 424 between the two adjacent connecting pieces 41. The first buffering portion 424 can absorb and buffer the tensile stress by deforming itself, which reduces the stress received by the joint between the connecting piece 41 and the electrode terminal 311, and thereby reducing the possibility of the joint between the connecting piece 41 and the electrode terminal 311 being cracked and split due to overly large stress received by the joint. Similarly, when two adjacent connecting pieces 41 are close to each other, the two adjacent connecting pieces 41 applies compressive stress to the first buffering portion 424. The first buffering portion 424 can absorb and buffer the compressive stress through its own deformation, which reduces the stress received by the joint between the connecting piece 41 and the electrode terminal 311, and thereby reducing the possibility of the joint between the connecting piece 41 and the electrode terminal 311 being cracked and split due to overly large stress received by the joint, so that the safety and reliability of the battery module 20 are improved. In addition, the structural design of the first buffering portion 424 to absorb and buffer tensile or compressive stress by its own deformation can also reduce the stress received by the joint between the connecting piece 41 and the insulating plate 42, and thereby reducing the possibility of the joint between the connecting piece 41 and the insulating plate 42 being cracked and split due to overly large stress received by the joint.

Figure 20:
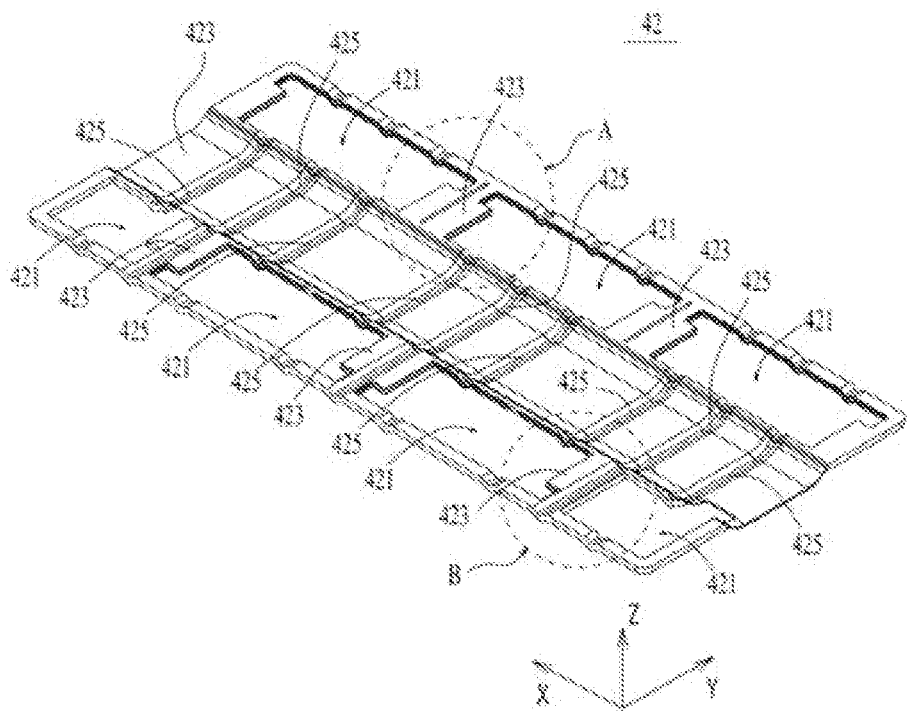
FIG. 20 is a schematic structural diagram of an insulating plate disclosed according to an embodiment of the present application.

In an embodiment, as shown in FIG. 20, the insulating plate 42 is provided with two columns of through holes 421. The two columns of through holes 421 are arranged at intervals along the width direction Y of the insulating plate 42. In each column of through holes 421, the partitioning portion 423 between two adjacent through holes 421 is provided with one first buffering portion 424. The direction in which the two through holes 421 are arranged is the same as the length direction X of the insulating plate 42. The direction in which the battery cells 30 are arranged is the same as the length direction X of the insulating plate 42. In the use of the battery module 20, the secondary battery 31 may swell and deform along the length direction X. Along the length direction X of the insulating plate 42, when two adjacent connecting pieces 41 are moving away from or close to each other, the two connecting pieces 41 applies tensile or compressive stress to the first buffering portion 424. In this embodiment, the direction in which the two adjacent connecting pieces 41 are arranged is the same as the length direction X of the insulating plate 42.

In an embodiment, the number of through holes 421 is seven. The number of connecting pieces 41 is also seven. The seven through holes 421 are arranged in two columns along the width direction Y of the insulating plate 42. One of the column includes four through holes 421 arranged at intervals along the length direction X of the insulating plate 42, and the other of the columns includes three through holes 421 arranged at intervals along the length direction X of the insulating plate 42. It can be understood that, the number of through holes 421 and the number of connecting pieces 41 are not limited to the above-mentioned numbers. The number of through holes 421 and the number of connecting pieces 41 can be adjusted according to actual product requirements.

Figure 22:
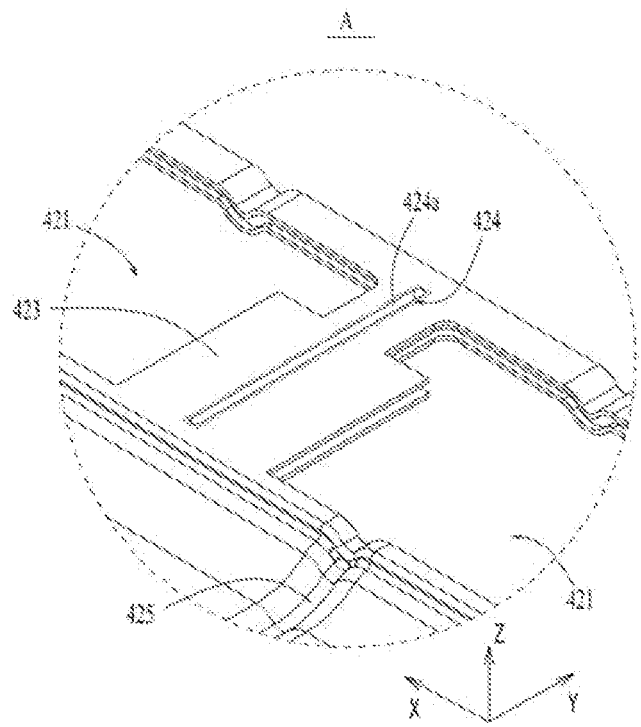
FIG. 22 is an enlarged view of an area A in FIG. 20.

In an embodiment, as shown in FIG. 22, the first buffering portion 424 includes one elongated through hole 424a. The length direction of the through hole 424a intersects the direction in which the two adjacent connecting pieces 41 are arranged. In this embodiment, the length direction of the through hole 424a is the same as the width direction Y of the insulating plate 42. The through hole 424a extends along the thickness direction Z of the insulating plate 42, so that the region of the through hole 424a forms a hollow structure. The rigidity of the region where the through hole 424a is arranged is lower than the rigidity of the region surrounding the through hole 424a, so that the region where the through hole 424a is arranged is more flexible and easier to be deformed by force. In this way, when two adjacent connecting pieces 41 apply tensile or compressive stress to the partitioning portion 423, the tensile or compressive stress squeezes the region of the through hole 424a, so that the through hole 424a is widen or narrowed in the length direction X of the insulating plate 42, so that it is easy to realize the stress buffering through deformation.

Figure 23:
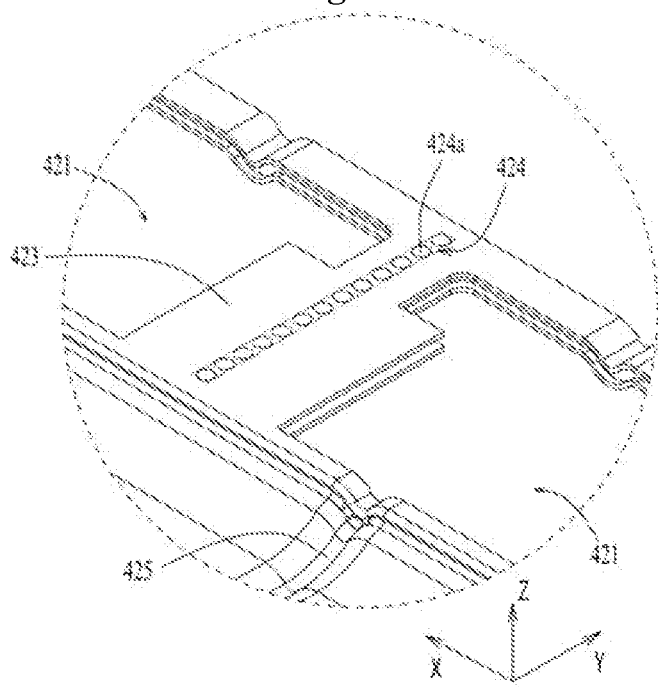
FIG. 23 is a schematic partial structural diagram of an insulating plate disclosed according to an embodiment of the present application.

In another embodiment, referring to FIG. 23, the first buffering portion 424 includes two or more through holes 424a. The two or more through holes 424a are arranged at intervals along a direction intersecting the direction in which two adjacent through holes 421 are arranged. The direction in which the two through holes 421 are arranged is the same as the length direction X of the insulating plate 42. The direction in which two adjacent connecting pieces 41 are arranged is the same as the length direction X of the insulating plate 42. In this embodiment, the two or more through holes 424a are arranged at intervals along the width direction Y of the insulating plate 42. In an example, the cross-section of the through hole 424a is circular, oval, racetrack-shaped, or regular polygon. In an embodiment where the cross-section of the through hole 424a is circular, oval, or racetrack-shaped, there is smooth transition between regions of the inner wall of the through hole 424a, which reduces the possibility of occurrence of a stress concentration region, thereby reducing the possibility of occurrence of local cracks or local fractures on the inner wall during the deformation process. In an embodiment where the cross section of the through hole 424a is a regular polygon, the cross section of the through hole 424a is a regular hexagon. In this embodiment, the cross section of the through hole 424a may be selected to be racetrack-shaped or oval.

Figure 24:
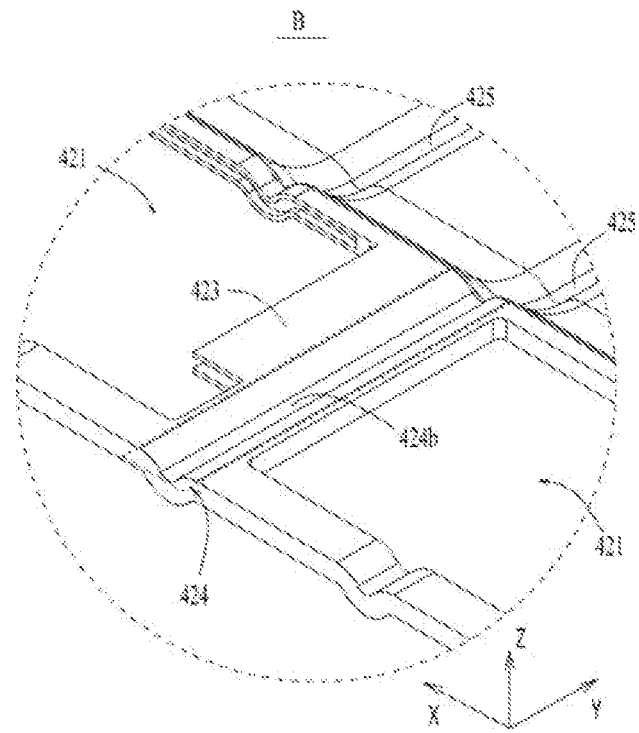
FIG. 24 is an enlarged view of an area B in FIG. 20.

In an embodiment, referring to FIG. 24, the first buffering portion 424 includes an arc-shaped structure 424b protruding along the thickness direction Z of the insulating plate 42. The arc-shaped structure 424b is elongated, and the length direction of the arc-shaped structure 424b intersects the direction in which two adjacent connecting pieces 41 are arranged. When the connecting pieces 41 on the two sides of the first buffering portion 424 are moving away from each other, the first buffering portion 424 is subject to tensile stress. With the tensile stress, the curvature of the arc-shaped structure 424b of the first buffering portion 424 will be reduced, so that the arc-shaped structure 424b is elongated in the arrangement direction, so as to absorb and buffer the tensile stress. Correspondingly, when the connecting pieces 41 on the two sides of the first buffering portion 424 is moving close to each other, the first buffering portion 424 is subject to compressive stress. With the compressive stress, the curvature of the arc-shaped structure 424b of the first buffering portion 424 will be increased, so that the arc-shaped structure 424b is shorted in the arrangement direction, so as to absorb and buffer the compressive stress. In an example, the arc-shaped structure 424b smoothly transitions to other parts of the partitioning portion 423, which reduces the possibility of stress concentration. In some embodiments, the arc structure 424b is a circular arc-shaped structure.

Figure 25:
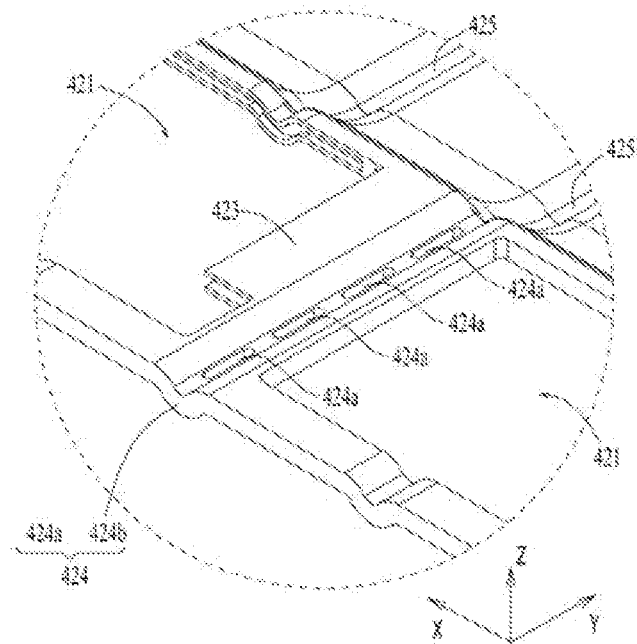
FIG. 25 is a schematic partial structural diagram of an insulating plate disclosed according to another embodiment of the present application.

In an embodiment, as shown in FIG. 25, the arc-shaped structure 424b is provided with a through hole 424a, so that the overall rigidity of the first buffering portion 424 can be further reduced, which helps to further improve the deformability and buffering ability of the first buffering portion 424. For example, the arc-shaped structure 424b is provided with four through holes 424a. The four through holes 424a are arranged at intervals along the width direction Y of the insulating plate 42. It can be understood that, the number of through holes 424a is not limited to four, and the number can be flexibly adjusted according to product requirements.

In an embodiment, referring to FIG. 20, along the width direction Y of the insulating plate 42, a first buffering portion 424 is arranged between two columns of through holes 421. Along the width direction Y of the insulating plate 42, when the connecting piece 41 in one of the columns and the connecting piece 41 in the other of the columns are moving away from each other or moving close to each other, the first buffering portion 424 can absorb and buffer the tensile or compressive stress applied by the connecting piece 41 to the first buffering section 424. In an example, along the length direction X of the insulating plate 42, the first buffering portion 424 extends through the entire insulating plate 42. In an example, the first buffering portion 424 is an arc-shaped structure. The side of the arc-shaped structure being away from the secondary battery 31 forms a receiving space. The electrode output plate 99 can be at least partially received in the receiving space, so that the structural compactness and space utilization of the battery module 20 can be improved, and the energy density of the battery module 20 can be improved. In another example, the first buffering portion 424 includes one through hole 424a or two or more through holes 424a.

In an embodiment, referring to FIG. 5, the connecting piece 41 includes two or more terminal connecting portions 412 and a second buffering portion 413. A second buffering portion 413 is arranged between two adjacent terminal connecting portions 412. The second buffering portion 413 can absorb and buffer external stress through its own deformation. After the terminal connecting portion 412 and the electrode terminal 311 are fixedly connected, when the secondary battery 31 swells and deforms, two adjacent terminal connecting portions 412 tend to move away from each other, thereby applying tensile stress to the second buffering portion 413. When the second buffering portion 413 is subjected to tensile stress, it will be stretched to buffer the tensile stress, thereby the tensile stress received between the terminal connecting portion 412 and the electrode terminal 311 can be reduced, which reduces the possibility of the terminal connecting portion 412 and the electrode terminal 311 being cracked and separated from each other due to overly large tensile stress received therebetween, and reduces the possibility of the joint between the connecting portion 411 of the connecting piece 41 and the insulating plate 42 being cracked and separated from each other due to overly large external stress received between the connecting portion 411 of the connecting piece 41 and the insulating plate 42. In this way, the first buffering portion 424 and the second buffering portion 413 can cooperate with each other to further effectively improve the ability of the connecting piece 41 and the insulating plate 42 to absorb and buffer stress.

In another embodiment, referring to FIG. 5, a second buffering portion 413 is provided between the terminal connecting portion 412 and the connecting portion 411. When the secondary battery 31 swells and deforms, two adjacent terminal connecting portions 412 tend to move away from each other, and the terminal connecting portion 412 and the connecting portion 411 tend to approach each other, so that the second buffering portion 413 between the terminal connecting portion 412 and the connecting portion 411 is subject to compressive stress. When the second buffering portion 413 is subjected to the compressive stress, it will be compressed to buffer the compressive stress, thereby reducing the possibility of the joint between the connecting portion 411 of the connecting piece 41 and the insulating plate 42 being cracked and split due to overly large external stress received between the connecting portion 411 of the connecting piece 41 and the insulating plate 42.

In an example, the second buffering portion 413 is an arc-shaped structure protruding along the thickness direction Z of the insulating plate 42. In some embodiments, the second buffering portion 413 has a circular arc-shaped structure.

In an example, referring to FIG. 20, the insulating plate 42 further includes a third buffering portion 425 arranged corresponding to the second buffering portion 413. When the second buffering portion 413 is subject to stress and plays a buffering role, the third buffering portion 425 will be deformed synchronously with the second buffering portion 413. The second buffering portion 413 and the third buffering portion 425 can cooperate with each other to help to further improve the ability of buffering stress. In an example, the second buffering portion 413 and the third buffering portion 425 have a same structure. The second buffering portion 413 and the third buffering portion 425 are correspondingly arranged along the width direction Y of the insulating plate 42. For example, the second buffering portion 413 and the third buffering portion 425 are both arc-shaped structures. In an example, along the width direction Y of the insulating plate 42, the first buffering portion 424 and the third buffering portion 425 of the insulating plate 42 are correspondingly arranged. When the first buffering portion 424 is subject to stress and plays a buffering role, the third buffering portion 425 will be deformed synchronously with the first buffering portion 424. For example, the first buffering portion 424 and the third buffering portion 425 are both arc-shaped structures.

In an embodiment, referring to FIG. 22 to FIG. 25, one partitioning portion 423 is provided with one first buffering portion 424. The width of the orthographic projection of the first buffering portion 424 in the arrangement direction of two adjacent through holes 421 is greater than or equal to the width of the orthographic projection of the connecting piece 41 in the arrangement direction, so that the first buffering portion 424 can cover the entire connecting piece 41 in the width direction Y. When the connecting piece 41 applies external stress to the partitioning portion 423, the external stress will be completely transferred to the first buffering portion 424 and absorbed and buffered by the first buffering portion 424, thereby reducing the possibility of the external stress being transferred to the region outside the first buffering portion 424 and compromising the buffering effect.

Figure 26:
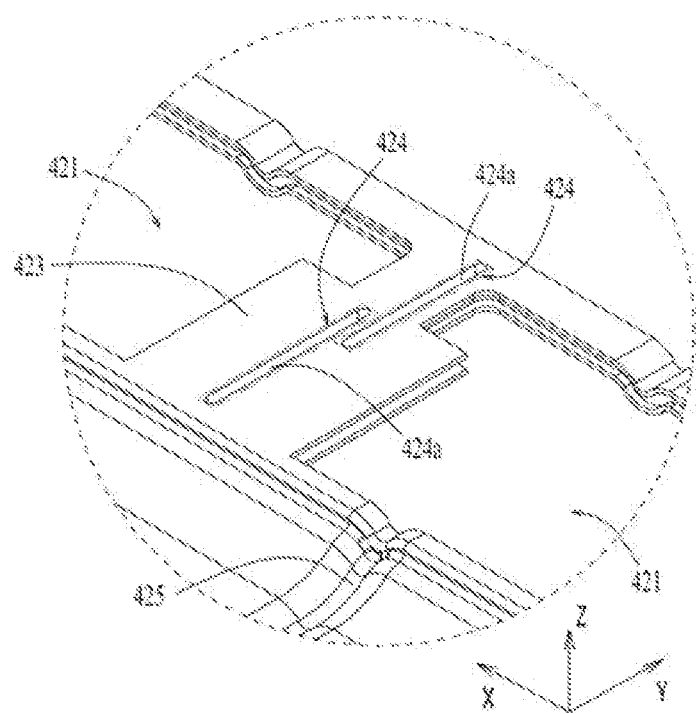
FIG. 26 is a schematic partial structural diagram of an insulating plate disclosed according to another embodiment of the present application.
Figure 27:
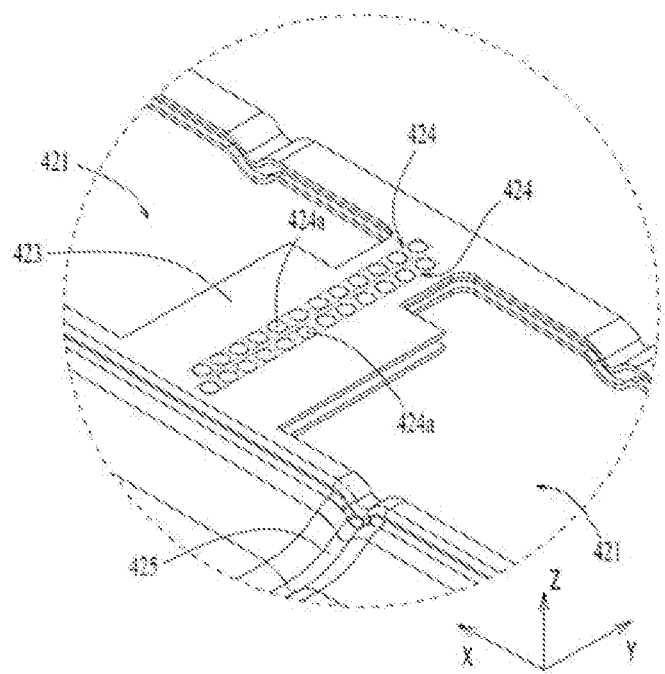
FIG. 27 is a schematic partial structural diagram of an insulating plate disclosed according to yet another embodiment of the present application.

In an embodiment, referring to FIG. 26 and FIG. 27, one partitioning portion 423 is provided with two first buffering portions 424. The two first buffering portions 424 are arranged at intervals along the direction in which two adjacent through holes 421 are arranged. In this way, the two first buffering portions 424 can better absorb the external stress applied to the insulating plate 42. In an example, as shown in FIG. 26, each of the two first buffering portions 424 includes one through hole 424a. The through hole 424a extends in the width direction Y of the insulating plate 42. Alternatively, as shown in FIG. 27, each of the two first buffering portions 424 includes two or more through holes 424a. The two or more through holes 424a are arranged at intervals along the width direction Y of the insulating plate 42. In some other examples, one of the two first buffering portions 424 may include one through hole 424a, and the other may include two or more through holes 424a In an example, the total width of the orthographic projection of the two first buffering portions 424 in the arrangement direction of the two adjacent through holes 421 is greater than or equal to the width of the orthographic projection of the connecting piece 41 in the arrangement direction. It can be understood that, the number of the first buffering portions 424 provided on one partitioning portion 423 is not limited to two, and may be three or more.

In an example, orthographic projections of two adjacent first buffering portions 424 in the arrangement direction of the through holes 421 overlap each other. In an example, in an embodiment where the first buffering portion 424 includes a through hole 424a, the center of each through hole 424a included in one first buffering portion 424 is aligned with the center of each through hole 424a included in another first buffering portion 424 along the arrangement direction.

In another example, referring to FIG. 26 and FIG. 27, the orthographic projections of two adjacent first buffering portions 424 in the arrangement direction are partially overlapped. In an example, in an embodiment where the first buffering portion 424 includes a through hole 424a, the center of each through hole 424a included in one first buffering portion 424 is offset from the center of each through hole 424a included in another first buffering portion 424 along the arrangement direction.

Figure 28:
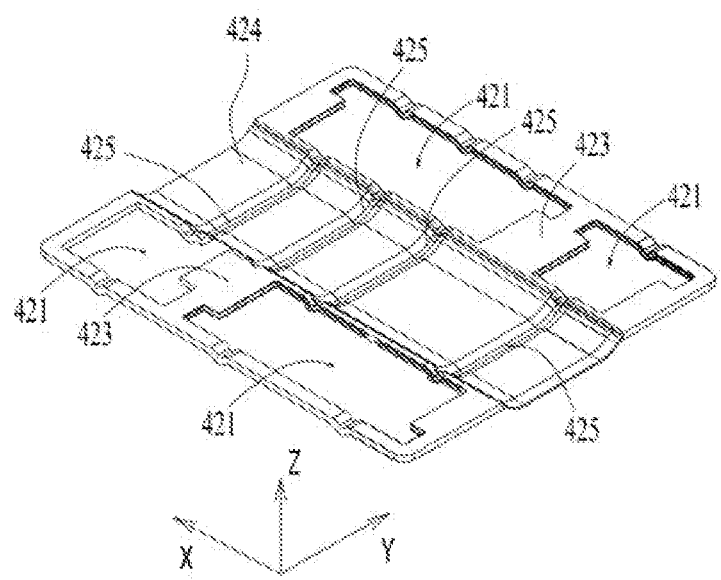
FIG. 28 is a schematic structural diagram of an insulating plate disclosed according to another embodiment of the present application.

In an embodiment, as shown in FIG. 28, two columns of through holes 421 are arranged at intervals along the width direction Y of the insulating plate 42. The first buffering portion 424 is provided only between the two columns of through holes 421. Along the width direction Y of the insulating plate 42, when the connecting piece 41 in one of the columns and the connecting piece 41 in the other of the columns are moving away from each other or moving close to each other, the first buffering portion 424 can absorb and buffer the tensile or compressive stress applied by the connecting piece 41 to the first buffering section 424. The number of through holes 421 in each column is two. It can be understood that, the number of through holes 421 in each column is not limited to two, and may also be one or three or more.

Figure 29:
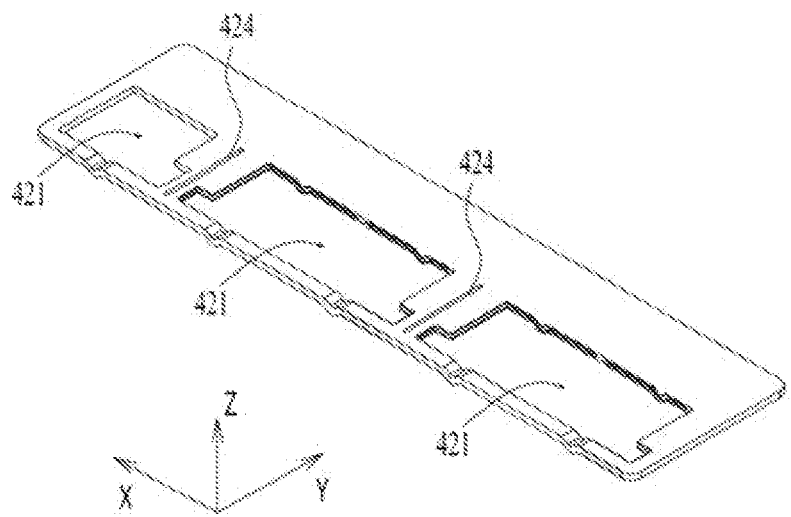
FIG. 29 is a schematic structural diagram of an insulating plate disclosed according to yet another embodiment of the present application.

In an embodiment, as shown in FIG. 29, two or more through holes 421 are arranged in a column along the length direction X of the insulating plate 42. The partitioning portion 423 between two adjacent through holes 421a is provided with the first buffering portion 424. It can be understood that, two or more through holes 421 are arranged side by side in a column along the width direction Y of the insulating plate 42. The direction of the through holes 421 are arranged is the same as the width direction Y of the insulating plate 42. The partitioning portion 423 between two adjacent through holes 421a is provided with the first buffering portion 424.

In an embodiment, according to product manufacturing requirements, each through hole 421 may be provided with one or two or more connecting pieces 41. The two or more connecting pieces 41 are distributed along the direction in which the two through holes 421 are arranged.

Figure 21:
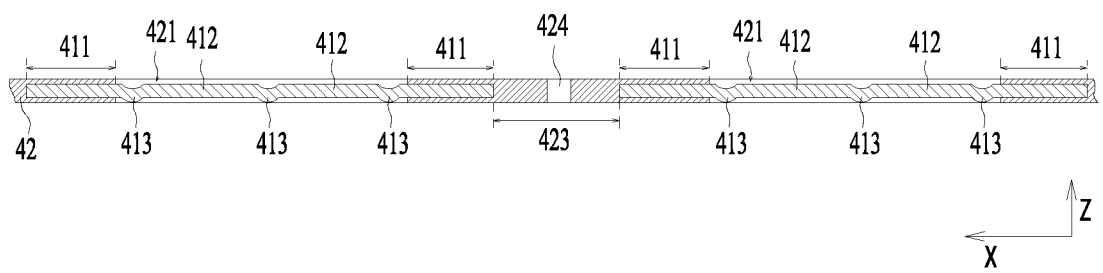
FIG. 21 is a schematic cross-sectional view of an embedding structure of a connecting piece and an insulating plate disclosed according to an embodiment of the present application.

In an embodiment, as shown in FIG. 21, along the thickness direction Z of the insulating plate 42, the terminal connecting portion 412 is arranged in the through hole 421, and the connecting portion 411 of the connecting piece 41 penetrates the hole wall of the through hole 421 and is embedded into the insulating plate 42, so that the upper surface and the lower surface of 42 in the thickness direction Z protrude from the upper surface and the lower surface of the terminal connecting portion 412, respectively. The lower surface of the terminal connecting portion 412 is configured to be electrically connected with the electrode terminal 311 of the secondary battery 31.

The connecting assembly according to the embodiments of the present application includes an insulating plate 42 and a connecting piece 41. The connecting assembly is applied to the battery module 20. The insulating plate 42 is provided with a through hole 421, a partitioning portion 423 separating two adjacent through holes 421, and a first buffering portion 424 provided on the partitioning portion 423. The connecting piece 41 is connected to the insulating plate 42 in an embedded manner by the connecting portion 411. The connecting piece 41 is arranged corresponding to the through hole 421. When the first buffering portion 424 is subject to external stress, it can absorb and buffer the external stress through its own deformation. In this way, on the one hand, when a position error occurs during the manufacturing process of the connecting piece 41 and the insulating plate 42, the position of the connecting piece 41 needs to be adjusted during the process of assembling the connecting assembly and the battery cells 30. Because of the provision of the first buffering portion 424, in the adjustment of the connecting piece 41, the first buffering portion 424 will be stretched or compressed to compensate for the adjustment displacement of the connecting piece 41, so that it is easy to adjust the connecting piece 41 to a predetermined position and fixedly connected to the electrode terminal 311 of the secondary battery 31. On the other hand, in the use of the battery module 20, the secondary battery 31 may swell and deform, which applies tensile stress to the connecting piece 41 connected to the secondary battery 31. Because of the provision of the first buffering portion 424, the connecting piece 41 can apply external stress to the first buffering portion 424, and the first buffering portion 424 can absorb and buffer the external stress through its own deformation, thereby reducing the possibility of the joint between the connecting piece 41 and the electrode terminal 311 being cracked and split due to overly large external stress received by the joint, reducing the stress received by the joint between the connecting piece 41 and the insulating plate 42, and reducing the possibility of the joint between the connecting piece 41 and the insulating plate 42 being cracked and split due to overly large external stress received by the joint, so that the safety and the reliability of the battery module 20 is improved.

Although the present application has been described with reference to the preferred embodiments, various modifications may be made thereto and components thereof may be replaced with equivalents without departing from the scope of the present application. In particular, as long as there is no structural conflict, the technical features mentioned in the embodiments can be combined in any manner. This application is not limited to the specific embodiments disclosed herein, instead, it includes all technical solutions that fall within the scope of the claims.

What is claimed is:

1. A connecting assembly for a battery module comprising two or more secondary batteries, wherein the connecting assembly comprises:
   a connecting piece configured to be electrically connected with the two or more secondary batteries, the connecting piece comprising a connecting portion;
   an insulating plate having an integrally modeled structure, wherein the connecting portion and the insulating plate are connected in a non-detachable manner to form an integral structure, and the insulating plate is configured to restrict movement of the connecting piece;
   wherein the connecting portion comprises a receiving portion, the receiving portion is an embedding through hole extending along a thickness direction of the insulating plate, and the insulating plate comprises a protrusion penetrating through the receiving portion, and portions of the insulating plate located on upper and lower sides of the connecting portion are connected by the protrusion; and
   wherein the insulating plate comprises a first region and a second region, a part of the second region is arranged as protruding from the first region, and the connecting portion is embedded inside the second region.

2. The connecting assembly according to claim 1, wherein a shape of the protrusion matches a shape of the receiving portion; or the connecting portion comprises a first connecting section and a second connecting section that are connected, and the first connecting section and the second connecting section are arranged offset to each other.

3. The connecting assembly according to claim 1, wherein the receiving portion comprises two or more extending sections, the two or more extending sections are arranged along a direction in which the receiving portion is recessed, and an orthographic projection of one of two adjacent extending sections lies within an orthographic projection of the other of the two adjacent extending sections.

4. The connecting assembly according to claim 2, wherein the receiving portion comprises two or more extending sections, the two or more extending sections are arranged along a direction in which the receiving portion is recessed, and an orthographic projection of one of two adjacent extending sections lies within an orthographic projection of the other of the two adjacent extending sections.

5. The connecting assembly according to claim 1, wherein the receiving portion is a hole or a groove.

6. The connecting assembly according to claim 1, wherein the receiving portion is arranged in an edge region of the connecting portion.

7. The connecting assembly according to claim 1, wherein the connecting assembly comprises two or more connecting pieces, the insulating plate comprises a first buffering portion, and the first buffering portion is arranged between two adjacent connecting pieces.

8. The connecting assembly according to claim 7, wherein
   the first buffering portion comprises one elongated through hole, and a length direction of the through hole intersects a direction in which the two adjacent connecting pieces are arranged; or
   the first buffering portion comprises two or more through holes, and the two or more through holes are arranged at intervals along a direction intersecting the direction in which the two adjacent connecting pieces are arranged; or
   the first buffering portion comprises an elongated arc-shaped structure, and a length direction of the arc-shaped structure intersects the direction in which the two adjacent connecting pieces are arranged.

9. The connecting assembly according to claim 1, wherein the connecting piece comprises a second buffering portion, the second buffering portion and the connecting portion are spaced from each other, the insulating plate comprises a third buffering portion arranged corresponding to the second buffering portion, and a part of the second buffering portion is embedded inside the third buffering portion.

10. The connecting assembly according to claim 1, wherein the insulating plate further comprises an elongated middle receiving recess, and at least one of two opposite sides of the middle receiving recess is provided with the connecting piece.

11. A battery module comprising:
   two or more secondary batteries;
   the connecting assembly according to claim 1, wherein the connecting assembly is arranged above the two or more secondary batteries, and the secondary batteries are electrically connected by the connecting piece.

12. An apparatus using a battery module as a power source, wherein the apparatus comprises the battery module according to claim 11, and the battery module is configured to provide electrical power.

* * * * *